United States Patent
Linden et al.

(10) Patent No.: US 10,445,782 B2
(45) Date of Patent: Oct. 15, 2019

(54) EXPANDED TRACKING AND ADVERTISING TARGETING OF SOCIAL NETWORKING USERS

(71) Applicant: Facebook, Inc., Menlo Park, CA (US)

(72) Inventors: Lee Charles Linden, San Francisco, CA (US); Benjamin Lewis, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 607 days.

(21) Appl. No.: 14/460,219

(22) Filed: Aug. 14, 2014

(65) Prior Publication Data
US 2016/0048880 A1 Feb. 18, 2016

(51) Int. Cl.
| | | |
|---|---|---|
| G06Q 30/00 | (2012.01) | |
| G06Q 30/02 | (2012.01) | |
| G06F 3/0482 | (2013.01) | |
| G06F 3/0488 | (2013.01) | |
| G06Q 50/00 | (2012.01) | |
| H04L 29/06 | (2006.01) | |

(52) U.S. Cl.
CPC ....... *G06Q 30/0269* (2013.01); *G06F 3/0482* (2013.01); *G06F 3/0488* (2013.01); *G06Q 30/0241* (2013.01); *G06Q 50/01* (2013.01); *H04L 67/42* (2013.01)

(58) Field of Classification Search
CPC ............... G06Q 30/0241; G06Q 50/01; G06Q 30/0269; G06F 3/0482; G06F 3/0488
See application file for complete search history.

(56) References Cited

U.S. PATENT DOCUMENTS

| | | | |
|---|---|---|---|
| 2005/0278231 A1 | 12/2005 | Teeter | |
| 2007/0226047 A1* | 9/2007 | Ward | G06Q 30/0203 705/7.32 |
| 2007/0244750 A1* | 10/2007 | Grannan | G06Q 30/02 705/14.64 |
| 2008/0249987 A1 | 10/2008 | Ogasawara | |

(Continued)

FOREIGN PATENT DOCUMENTS

| | | |
|---|---|---|
| JP | 2010-146153 A | 7/2010 |
| JP | 2010-537323 A | 12/2010 |

(Continued)

OTHER PUBLICATIONS

International Search Report & Written Opinion as received in PCT/US2014/051360 dated May 14, 2015.

(Continued)

*Primary Examiner* — Mario C. Iosif
(74) *Attorney, Agent, or Firm* — Keller Jolley Preece

(57) ABSTRACT

The present disclosure relates, in part, to an advertisement system that provides for the augmentation of social networking profiles with information derived from user activity associated with third-party content outside of a social networking system. The augmented profiles of users may be analyzed and compared to identify targeted advertisement opportunities for one or more users. The advertisement system can analyze the augmented profiles of one or more users to identify look-alike product advertisement opportunities, look-alike user advertisement opportunities, as well as various remarketing, reminders, and cross-device marketing opportunities.

20 Claims, 11 Drawing Sheets

(56) References Cited

U.S. PATENT DOCUMENTS

| | | | | |
|---|---|---|---|---|
| 2011/0196757 A1* | 8/2011 | Pacella | ................. | G06Q 30/00 |
| | | | | 705/26.1 |
| 2011/0264523 A1 | 10/2011 | Scott et al. | | |
| 2012/0054040 A1 | 3/2012 | Bagherjeiran et al. | | |
| 2012/0054666 A1* | 3/2012 | Baird-Smith | .......... | G06Q 10/10 |
| | | | | 715/780 |
| 2012/0166520 A1* | 6/2012 | Lindsay | ............. | G06Q 30/0241 |
| | | | | 709/203 |
| 2014/0122367 A1* | 5/2014 | Godsey | ................. | G06Q 50/28 |
| | | | | 705/330 |
| 2014/0372236 A1* | 12/2014 | Sylvester | ............ | G07G 1/0009 |
| | | | | 705/22 |

FOREIGN PATENT DOCUMENTS

| | | | |
|---|---|---|---|
| KR | 10-2013-0096041 | 8/2013 | |
| WO | WO 2009/026395 | 2/2009 | |
| WO | WO 2009026395 A1 * | 2/2009 | ............ G06Q 10/10 |
| WO | WO 2013-152060 A1 | 10/2013 | |
| WO | WO2016025006 | 2/2016 | |

OTHER PUBLICATIONS

Office action as received in Japanese application 2017-508065 dated Sep. 4, 2018.

\* cited by examiner

EXPANDED TRACKING AND ADVERTISING TARGETING OF SOCIAL NETWORKING USERS

CROSS REFERENCE TO RELATED APPLICATIONS

This application relates to U.S. patent application Ser. No. 12/977,038, filed Dec. 22, 2010, entitled "Determining Advertising Effectiveness Outside of a Social Networking System," and U.S. patent application Ser. No. 14/177,300, entitled "Generating User Audience Groups to Facilitate Advertisement Targeting." The entire contents of the foregoing applications are hereby incorporated by reference in their entirety.

BACKGROUND

1. Technical Field

One or more embodiments relate generally to an online social networking system. More specifically, one or more embodiments relate to providing social networking system users with targeted advertising.

2. Background and Relevant Art

A social networking system allows its users to connect to and communicate with other social networking system users. Each user may create a profile on a social networking system that corresponds to a user identity and may include information about each specific user, such as interests and demographic information. Because of the increasing popularity of social networking systems, as well as the increasing amount of user-specific information to which a social networking system has access, a social networking system may provide an ideal forum for advertisers to increase awareness about products or services.

Generally, advertisers may include third-party merchants (e.g., entities separate from the provider of a social network system). Many merchants provide merchant content (e.g., websites, applications) to promote and sell products and/or services outside of the social networking system. Merchants may desire to advertise to users within a social networking system to drive more user traffic to the merchant's content. For example, presenting advertisements to users within a social networking system can allow a merchant to gain increased public awareness for its products and/or services.

Conventionally, a merchant can track an individual user's activity with respect to the merchant's content (e.g., website, application), however, the merchant generally lacked any additional information about the user that would be helpful in advertising the merchant's products to the user, or to other potential customers, based on activity of an individual user. More often than not, a merchant's best opportunity to use an individual user's activity with respect to merchant content is send a follow-up communication to the individual user, assuming the merchant has an email address or physical address for the user. Therefore, the merchant's advertising activities are often inefficient, limited in nature, and lack accurate targeting to customers.

In contrast to an individual merchant, a social networking system can include a wealth of information associated with known specific users. Conventional merchant systems and social network systems, however, have no way of correlating user activity related to merchant content with a known user of a social networking system. Traditionally, therefore, the targeting accuracy of a merchant's advertising efforts within a social networking system is limited. For example, although targeted advertising is possible within the social networking system, the targeted advertising may be limited to only user information provided and collected within the social networking system itself. Therefore, conventional targeted advertisement efforts within social networking systems do not account for potentially large amounts of user activity that takes place outside the social networking system (e.g., user activity with respect a merchants' websites).

Accordingly, there are a number of disadvantages with conventional methods of providing targeted advertising to users of a social network.

SUMMARY

One or more embodiments described herein provide benefits and/or solve one or more of the foregoing or other problems in the art with systems and methods for augmenting social networking profiles with information derived from user activity outside of a social networking system, and using the augmented social networking profiles for targeted advertising. For example, one or more embodiments include systems and methods of maintaining a social networking profile for a user based on social networking activity within the social networking system. Additionally, the systems and methods may also collect third-party content activity data generated in response to the user interacting with third-party content (e.g., websites and applications outside of the social networking system). In one or more embodiments, the systems and methods augment the user's social networking profile with the third-party activity data to provide an augmented user profile that more accurately reflects interests and characteristics of a specific user. The augmented social networking profile can allow for various targeting advertisement techniques, including targeted advertisements related to one or more products with which the user indicated a level of interest while interacting with the third-party content.

In particular, the augmented profile can provide a unified representation of the user's activities within the social networking system as well as with third-party content. For example, in one or more embodiments, the augmented profile can identify a specific product or type of product in which the user has expressed an interest based on activity within the social networking system, activity with third-party content, or both. In some embodiments, the systems and methods can use the augmented profile and/or the identified product to provide improved target advertising to the user as well as other users of the social networking system.

In one or more embodiments, for example, the systems and methods can use the augmented profile of a user to provide remarketing advertisements of the identified product to the user. For example, a user can interact with third-party content associated with a product, and then at a later time, the systems and methods cause the social networking system to provide the user with an advertisement related to the identified product. Alternatively, or additionally, the social networking system can provide the user with one or more advertisements for other products related to the product the user viewed on the third-party content. Thus, the systems and methods described herein allow a social networking system to remarket products with which a user interacted by way of third-party content.

Furthermore, the systems and methods disclosed herein can provide for cross-device target advertising. For example, when a user views a product on a first computing device, the systems and methods may update (augment) the social networking profile of the user, and send targeted advertising related to the product to a second computing device associated with the user when the user accesses the second computing device. Additionally, a user may begin, but not complete, a purchase of a product using third-party content on a first computing device. The systems and methods disclosed herein can provide an advertisement to the user on a second computing device at a later time with a link to a landing page for completing the purchase.

Moreover, in one or more embodiments the systems and methods can provide for look-alike targeting of other users that likely would have an interest in the identified product based on a comparison of user profiles. In particular, the augmented profiles of users may be compared, and when sufficiently similar, the systems and methods may send an advertisement for the identified product to other users. Alternatively, or additionally, the systems and methods may inform the merchant associated with the identified product that one or more other users are a potential target purchaser of the identified product, thus providing the merchant the ability to target the one or more other users.

Additional features and advantages of the embodiments will be set forth in the description that follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. In the following drawings, bracketed text and blocks with dashed borders (e.g., large dashes, small dashes, dot-dash, dots) are used herein to illustrate optional features or operations that add additional features to embodiments of the disclosure. Such notation, however, should not be taken to mean that these are the only options or optional operations, and/or that blocks with solid borders are not optional in certain embodiments of the disclosure. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1A:
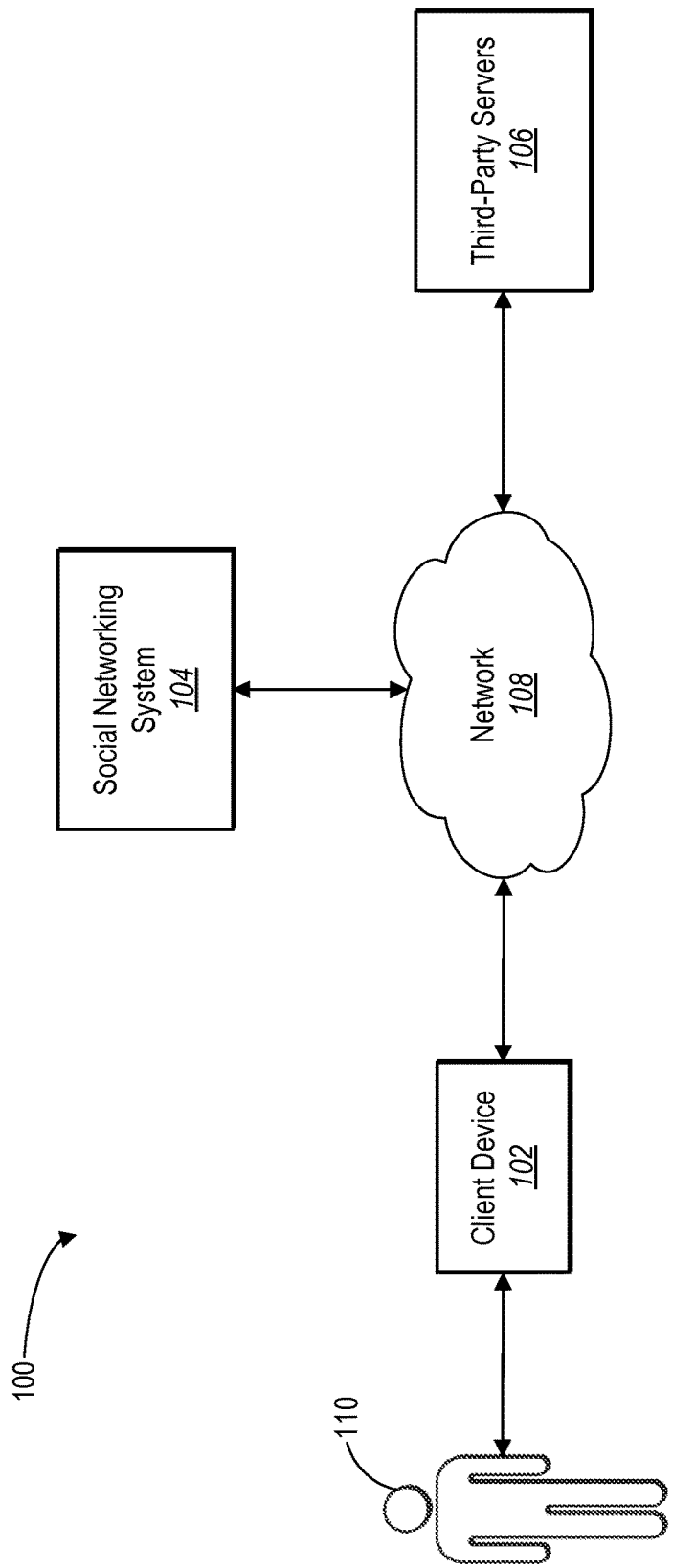
FIG. 1A illustrates a schematic diagram of an advertisement system in accordance with one or more embodiments.

One or more embodiments of the present disclosure relate to an advertisement system that includes systems and methods for augmenting a social networking profile of a user within a social networking system with information derived from user activity related to third-party content. For example, the third-party content may include websites, applications, application data, and various other third-party content sources that are outside the social networking system. The advertisement system can use the augmented social networking profile (or simply "augmented profile") to provide effective targeted advertising to a user of a social networking system based on the user's activity related to third-party content, as well as the user's activity within the social networking system. One or more embodiments of an advertisement system can include various methods of analyzing and/or processing an augmented profile of one or more users to provide effective and accurate targeted advertising to users of a social networking system.

More particularly, one or more embodiments of an advertisement system may allow for the tracking of a user's interactions with third-party content related to a product on a per user basis. For example, upon a user interacting with third-party content related to a product on a client device, the client device may send the social networking system a product identifier associated with the product and a user identifier associated with the user. Third-party content interactions may include, for example, the user viewing the product on a website, filling out a survey about the product, placing the product in a shopping cart and/or purchasing the product. The social networking system can use the product identifier and the user identifier to augment the user's social networking profile to reflect the user's demonstrated level of interest in the product.

In contrast to conventional techniques and methods, one or more embodiments of the advertisement system allow user activity related to third-party content to be combined with user activity within a social networking system. In particular, the advertisement system can combine known user information from a user's social networking profile (e.g., name, demographic information), social networking activity data (e.g., contacts (e.g., "friends"), likes, comments, clicks, groups, geographic location), and third-party content activity data of a user. The combination of user information, social networking activity data, and third-party content activity data provides an information rich augmented profile for each user of the social networking system that may take into account a significant portion of a user's online activity. Therefore, the advertisement system can use the augmented profile to more accurately provide targeted advertisements to users, creating more efficient and successful advertising results.

In addition, the advertisement system allows a merchant the ability to know additional information about a user that interacted with the merchant's third-party content. For example, one or more embodiments of the advertisement system can correlate a user's activity with third-party content with a known user identity. In addition, the advertisement system can correlate a user's activity on third-party content with user characteristics and/or social networking activity of the user. Thus, compared to conventional systems, the advertisement system provides merchants the ability to not only identify users that have interacted with the merchants' third-party content, but also provides merchants additional information about users that may be helpful in determining how to best advertise to potential customers.

In one or more embodiments, an advertisement system can use augmented profiles in a variety of ways to provide targeted advertisements to a user that interacts with third-party content. For example, one or more embodiments of an advertisement system allow for remarketing of a product to a user. In particular, an advertisement system can use a user's augmented profile to determine that the user is interested in a product based on the user's interaction with third-party content (e.g., viewing a product information page on a merchant's website). At a later time, the advertisement system can provide a targeted advertisement to the user by way of a social networking system.

Moreover, example embodiments of the advertisement system can analyze a user's augmented profile to determine one or more other products in which the user may be interested. For example, one or more embodiments of the advertisement system can identify a product based on the user's augmented profile, and then identify related or lookalike products based on the identified products. The advertisement system can then provide one or more targeted advertisements that include the related products or the look-alike products.

Additionally, one or more embodiments of an advertisement system can analyze the a users augmented profile and determine that a user interacted with third-party content related to a product using a first computing device, such as a smartphone. The advertisement system may then determine, based on information associated with the user, a second computing device (such as a laptop computer) associated with the user. In one or more embodiments, when the user connects to the social networking system using the second computing device, the advertisement system can deliver a targeted advertisement associated with the product to the second computing device of the user.

As a more specific example, in one or more embodiments, an advertisement system can analyze a user's augmented profile and determine that a user started a purchasing process on the first computing device, but did not complete the purchase. In particular, some users may be more likely to make a purchase on a desktop or laptop, compared to making a purchase on a smartphone. At a later time, the advertisement system may detect that the user is present on a second computing device, and deliver a targeted advertisement to the second computing device with a link to a landing page through which the user may complete the purchase of the product.

The advertisement system's ability to deliver cross-device targeted advertising based on an augmented profile, as generally described above, provides a more effective targeted advertisement opportunity compared to conventional methods and systems. Furthermore, a targeted advertisement can serve as a reminder to the user to purchase the exact product in which the user displays an interest.

In addition to providing targeted advertisements to the user that interacted with the third-party content, one or more embodiments of an advertisement system can use a user's augmented profile to provide targeted advertisements to other users of a social networking system. In one or more embodiments, the advertisement system may provide user look-alike target advertising of products to other users who, according to the users' augmented profiles, appear to have similar interests and/or behaviors.

In particular, the advertisement system may determine that a first user has purchased a product based on the first user's augmented profile. The advertisement system may then identify a second user having an augmented profile that indicates the first user and the second user have a threshold level of similarity with respect to one or more characteristics of the first user's augmented profile and the second user's augmented profile. The advertisement system may then send a targeted advertisement related to the product to the second user. In one or more embodiments, the advertisement system may execute one or more rules with relation to making the comparison between augmented profiles of social networking users to determine when users are sufficiently alike to trigger user look-alike targeting advertisements.

As used herein, the term "targeted advertising" or "targeted advertisement" refers to advertising content selected and provided to one or more users based on characteristics or attributes associated with the one or more users. For example, targeted advertising includes identifying an interest, or likely interest, of a user, and providing advertising content based upon the identified interest of the user.

In addition, as used herein, the term "content" refers to any form of digital data that may be transmitted over a communication network. For example, content can include, but is not limited to, web sites, web pages, digital media (e.g., audio, video, images), electronic documents, electronic communication messages, or any other digital content or combination of digital content. In addition, the term "third-party content" refers to content that is provided by a content source that is outside of a social networking system.

The term "product" or "products," as used herein, refers to both goods and services provided by one or more merchants. For example, a product can refer to a tangible good as well as a service.

FIG. 1A illustrates an example schematic diagram of an advertisement system 100 (or simply "system 100"). As illustrated in FIG. 1A, the system 100 may include a client device 102, a social networking system 104, and third-party servers 106 that are communicatively coupled through a network 108. As further illustrated in FIG. 1A, a user 110 may interface with the client device 102 to access content and/or services on the social networking system 104 and/or the third-party servers 106. Although FIG. 1A illustrates a particular arrangement of the client device 102, the social networking system 104, the third-party servers 106, and the network 108, various additional arrangements are possible.

For example, the client device 102 may directly communicate with the social networking system 104, bypassing network 108.

As illustrated in FIG. 1A, system 100 can include a user 110. For example, the user 110 may be an individual (i.e., human user), a business, a group, or other entity. Although FIG. 1A illustrates only one user 110, it is understood that system 100 can include a plurality of users, with each of the plurality of users interacting with the system 100 through a corresponding plurality of client devices 102. The client device 102 may include various types of computing devices. For example, the client device 102 can include a mobile device such as a mobile telephone, a smartphone, a PDA, a tablet, a laptop or a non-mobile device such as a desktop, server or other computing device. Additional details with respect to the client device are discussed below with respect to FIG. 8.

As mentioned, the client device 102, social networking system 104, and third-party servers 106 may communicate via network 108, which may include one or more networks and may use one or more communications platforms or technologies suitable for transmitting data and/or communication signals. Additional details relating to the network 108 are explained below with reference to FIG. 9.

In addition, and as shown in FIG. 1A, the system 100 further can include the social networking system 104. In one or more embodiments, the social networking system 104 may generate, store, receive, and transmit social networking data, such as social network posts or messages sent from the client device 102 associated with the user 110 (e.g., the social network system provided by Facebook, Inc.™). For example, the user 110, using the client device 102, can interact with content on the social networking system 104, such as liking, commenting, sharing, or viewing various social networking posts, pages, messages, and other social networking content.

The social networking system 104 may track the user's 110 activity within the social networking system 104, and store social networking activity data within a social networking profile associated with the user 110. In one or more embodiments, the social networking system 104 can provide the user 110 with an option to opt in or opt out of having the social networking system 104 track the user's 110 activity. Additionally, the user 110 may select, as user privacy settings associated with the user's 110 social network account, one or more options that allow the user to select which types of activity the social networking system 104 tracks. In any event, the tracking of the user's 110 activity, both within the social networking system, as well as on third-party content, is done in accordance with privacy policies on the social networking stem 104 and per the user's 110 privacy settings.

In one or more embodiments, a merchant may establish a presence on the social networking system 104 in an effort to share social networking content regarding the merchant's products with social networking system 104 users. For example, the merchant may post information about itself, about its products, or provide other information to the social networking system 104 users with a brand page associated with the merchant. The social networking system 104 can track the user's 110 activity with respect to the merchant's social networking content, and augment the user's 110 social networking profile with social networking activity data that corresponds to the user's 110 activity on the social networking system 104. Additional details relating to the social networking system 104 are discussed below with reference to FIG. 9.

As further illustrated in FIG. 1A, the client device 102 may also communicate with the third-party servers 106. In one or more embodiments, the third-party servers 106 can include one or more web servers or application servers that deliver third-party content to the client device 102. For example, the third-party servers 106 can provide third-party content in the form of a merchant's website through which the user can purchase the merchant's products. Additionally, the third-party servers can provide third-party content to a merchant's standalone application installed on the client device 102.

Moreover, the client device 102 and/or the social networking system 104 can communicate with other third-party systems that can capture or collect user activity. For example, a merchant's in-store POS system can track sales that users make within a merchant's retail store location. In one or more embodiments, for instance, a merchant's in-store POS system can identify a user, associate the user's purchase activity with the user identity, and send the purchase activity to the social networking system 104, either directly or via the client device 104.

For example, a merchant's POS system may be able to detect identifying information of a user from a user's client device 102 (e.g., smart phone) when the user is located within a close proximity of an in-store register of the merchant's POS system. For instance, the merchant's POS system can detect a client device 102 ID or a user ID located on the client device 102. Thus, the merchant's POS system could associate the identifying information with the items purchased at an in-store retail location.

In addition, in-store retail locations can provide users with shopping tracking devices, or cause a user's client device 102 to be the shopping tracking device, which can track a user's activity while shopping in the store. In one or more embodiments, the in-store retail location can provide a free Wifi connection that can track the user's shopping and browsing. In general, the user's position and activity within an in-store location can be tracked using a variety of network connections, applications, positioning systems, and devices.

Regardless of the specific implementation, a shopping tracking device can track which items the user is browsing. For instance, a shopping tracking device can determine the location of the user with respect to a particular product, and in addition, determine the amount of time the user spends near the particular product. For example, the more time a user spends in close proximity of a particular product, the more interest the user is demonstrating in the particular product. In addition to specific product information, a shopping tacking device can simply communicate the types of stores the user is visiting, allowing the system 100 to infer user interest. The shopping tracking device can then communicate the shopping activity information (e.g., product ID information) as well as user identification information, to the social networking system 104 using one or more techniques as will be described in further detail below.

In addition to the in-store activity described above, the system 100 can also track the user's 110 online activity. In particular, and as will be described below in detail, the system 100 allows the user 110 to interact with the client device 102 to request and receive third-party content from the third-party servers 106. In one or more embodiments, the third-party content can include one or more tracking elements that cause the client device 102 to send identification information associated with the user 110, as well as identification information associated with one or more aspects of the third-party content, to the social networking system 104. The social networking system 104 can then use the identification information associated with the user 110 and the identification information associated with one or more aspects of the third-party content to augment the user's 110 social networking profile. The social networking system 104 and/or a merchant can leverage the user's 110 augmented profile to provide various targeted advertisements to the user 110 and other users of the social networking system 104, as will be discussed in greater detail below.

Figure 1B:
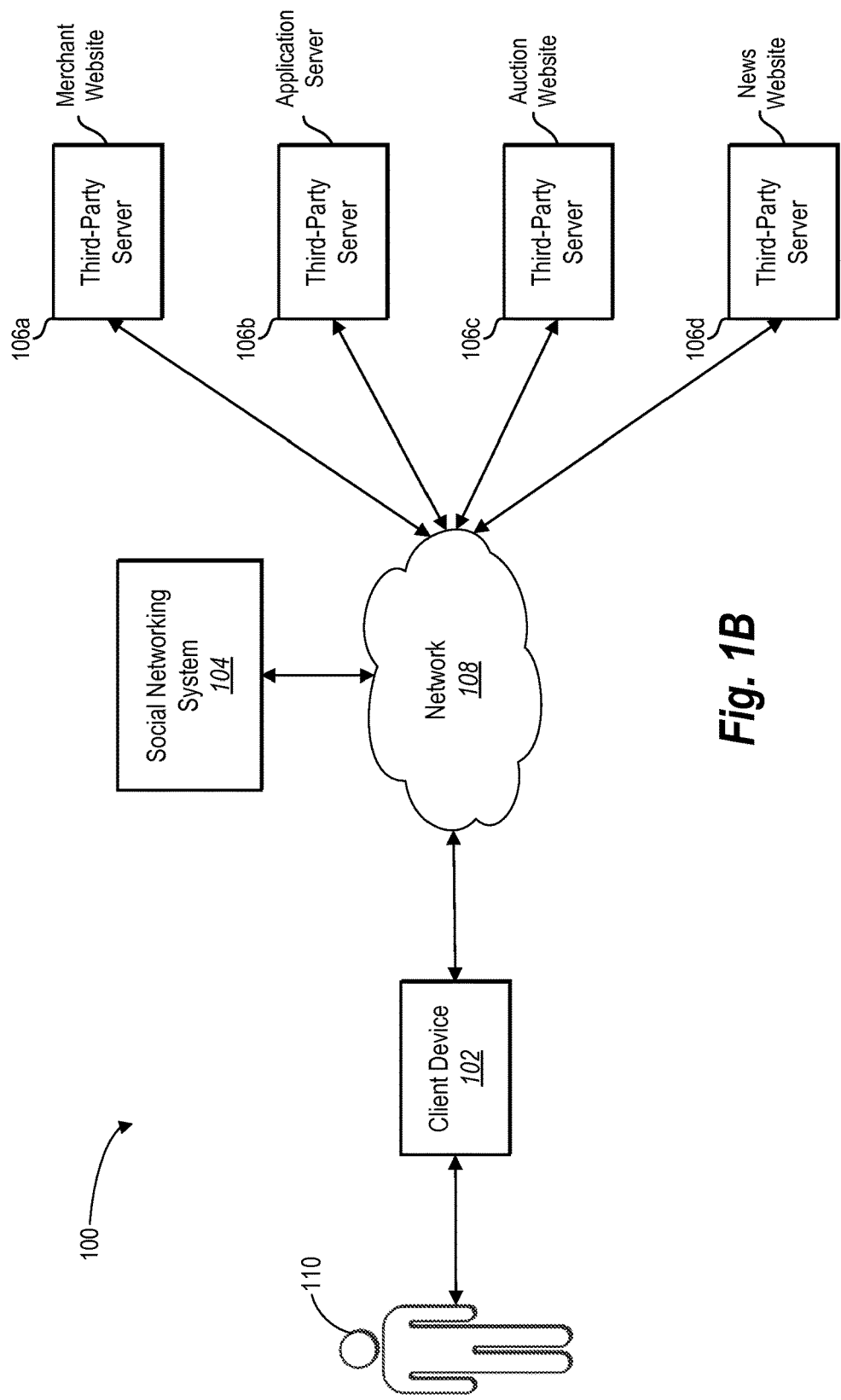
FIG. 1B illustrates a more detailed schematic diagram of the advertisement system shown in FIG. 1A in accordance with one or more embodiments.

FIG. 1B illustrates a more detailed example of the third-party servers 106 shown in FIG. 1A. In particular, the third-party servers 106 in FIG. 1A can represent any number of third-party servers 106 that provide access to any number of types of third-party content. For example, FIG. 1B illustrates a few examples of third-party servers 106, which include, but are not limited to, a merchant website 106a, a smartphone application provider 106b, an auction website 106c, and a news website 106d (collectively, "third-party servers 106").

Each of the third-party servers 106 may provide various types of third-party content to the user's 110 client device 102. In one or more embodiments, for example, the merchant website 106a can provide an e-commerce website that allows the user 110 to access information regarding the merchant's products, as well as purchase the merchant's products. In one or more embodiments, the system 100 can augment the user's 110 social networking profile with data representing the user's 110 activity with respect to the merchant website 106a.

For example, the system 100 can identify one or more products the user 110 views while accessing the merchant website 106a. In addition, the system 100 may identify that the user 110 selects one or more products to include in a "shopping cart" on the merchant website 106a. Moreover, the system 100 can identify one or more products the user 110 purchases from the merchant website 106a. Upon identifying any user 110 activity with respect to the merchant website 106a, the system 100 can augment the user's 110 social networking profile to reflect the user's 110 activity with respect to the merchant website 106a.

In addition to the merchant website 106a, FIG. 1B illustrates that the application server 106b can provide third-party content to the client device 102 of the user 110. For example, the application server 106b may host/support one or more applications assessable to the user 110 using the client device 110. In one or more embodiments, the application server 106b can provide third-party content to the client device 102 in the form of applications, application content, in-app purchases, text, streaming audio or video, or any other content associated with a particular application. For example, a merchant application many be installed on the client device 102 that allows the user 110 to view and purchase one or more merchant products. Other examples of applications can include media applications, such as streaming audio or video applications. Regardless of the type of third-party content the application server 106b provides, the system 100 can identify the third-party content (e.g., songs, movies, TV shows, games, purchases) with which the user interacts and augment the user's 110 social networking profile to reflect the user's 110 activity with respect to one or more applications on the client device 102.

As further illustrated in FIG. 1B, an example of a third-party server 106 includes an auction website 106c. For example, the auction website 106c can send auction information regarding various products to the client device 102 to allow the user 110 to participate in an online auction. Similar to the above examples, system 100 can identify third-party content that the auction website 106c provides to the client device 102. For example, system 100 can identify a product the user 110 views, bids on, and/or purchases though the auction website 106c. In addition, the system 100 can identify bid amounts, bid dates, and auction ending times. The system 100 can augment the user's 110 social networking profile to reflect the user's 110 activity related to the auction website 106c.

In addition to third-party servers 106 that can market and/or sell a merchant's products, one or more embodiments of the system 100 can identify third-party content related to topics, and augment the user's 110 social networking profile with the user's activity with respect to a topic. For example, and as illustrated in FIG. 1B, a third-party server 106 can include a news website 106d that provides third-party content in the form of news and articles (e.g., sports, business, politics, entertainment). For instance, the user 110 may use the client device 102 to access the news website 106d to check the score of the user's 110 favorite sports team. In one or more embodiments, the system 100 can identify the user's 110 favorite sports team based on the third-party content the user accesses through the news website 106d. In turn, the system 100 can augment the user's 110 social networking profile to reflect the user's 110 demonstrated interest in the sports team.

As illustrated above, the types of third-party content the third-party servers 106 may provide can vary greatly and provide a broad spectrum of information about the user's 110 interests based on the user's 110 activity corresponding to the third-party servers 106. In addition, and as briefly described above, the system 100 can use user 110 information, third-party content activity data, along with social networking activity data collected from the user's 110 activity within the social network system 104, to provide effective targeting advertisements to the user 110. In particular, the system 100 can use the augmented profile of the user 110 to identify targeting advertisement opportunities.

The following demonstrates an overview of an example embodiment of the system 100, illustrated in FIG. 1B. For instance, the system 100 may identify, based on the augmented profile of the user 110, that the user 110 is interested in the San Francisco Giants because the user 110 accesses third-party content associated with the San Francisco Giants from the news website 106d. In addition, the system 100 may identify that the user 110 views hats on merchant website 106a. The system 100 can augment the user's 110 profile with the third-party content activity data that indicates the user's 110 interests based on the third-party content activity.

Using the augmented profile, the system 100 can identify one or more targeted advertising opportunities. For example, the system 100 may identify that the merchant website 106a sells one or more San Francisco Giants baseball hats. Based on an advertisement agreement with the merchant, for example, the system 100 can cause the social networking system 104 to provide a targeted advertisement (e.g., a post, a newsfeed message, a direct message) to the client device 102 to present to the user 110.

In addition, based on the known interest of the user 110 in the Giants, the system 100 can identify additional targeted advertising opportunities. For example, the system 100 may cause the social networking system 104 to provide a targeted advertisement to the client device 102 to present to the user 110 with respect to an auction for a baseball signed by the 2012 Giants team on the auction website 106c. Thus, the system 100 can leverage information within an augmented profile (e.g., third-party content activity data, user information on the social networking system, and social networking activity data) to substantially increase the accuracy of targeted advertisements provided to the user. Additional details and features of system 100 will be discussed in detail below.

Figure 2:
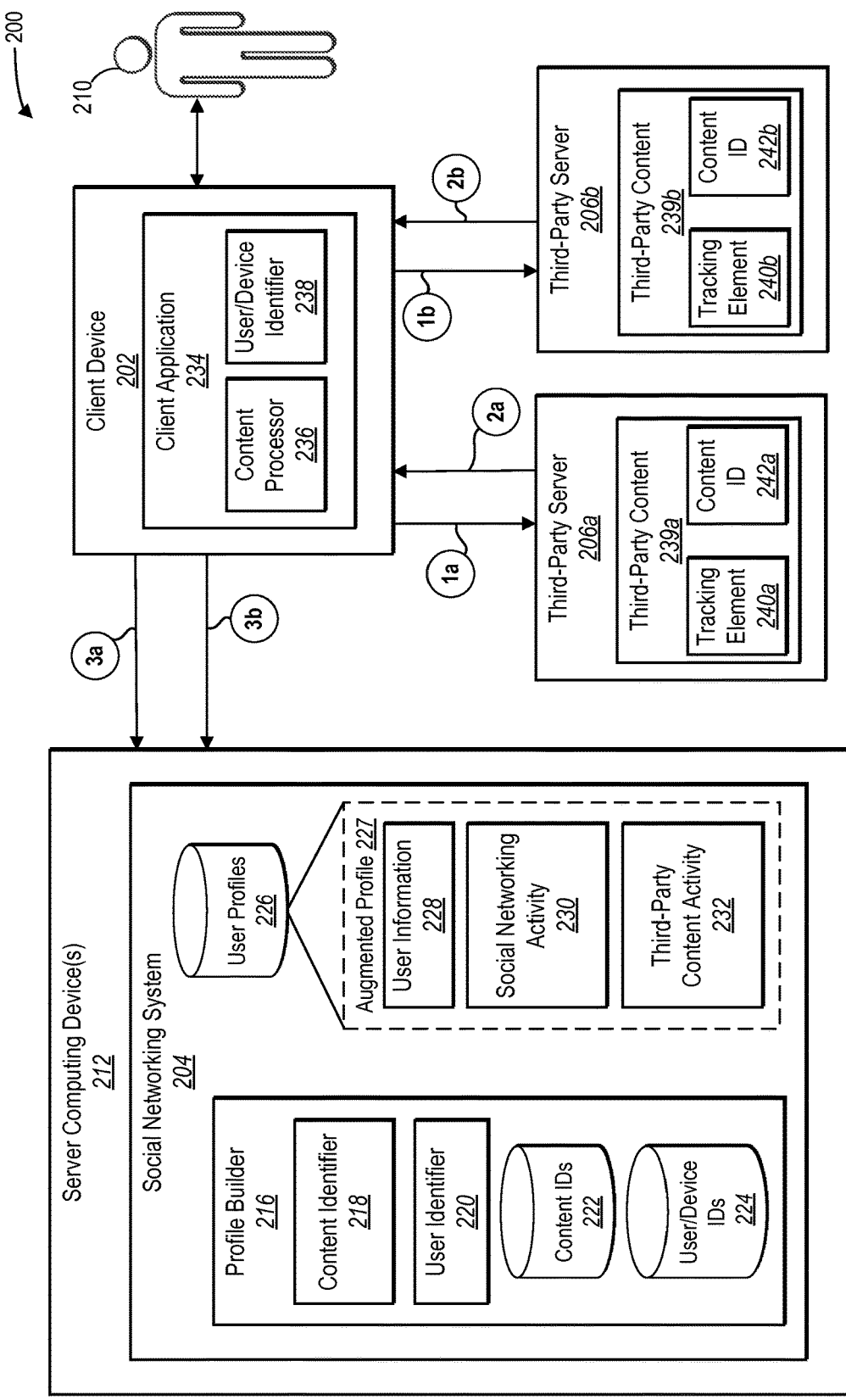
FIG. 2 illustrates a detailed schematic diagram of an advertisement system in accordance with one or more embodiments.
Figure 3:
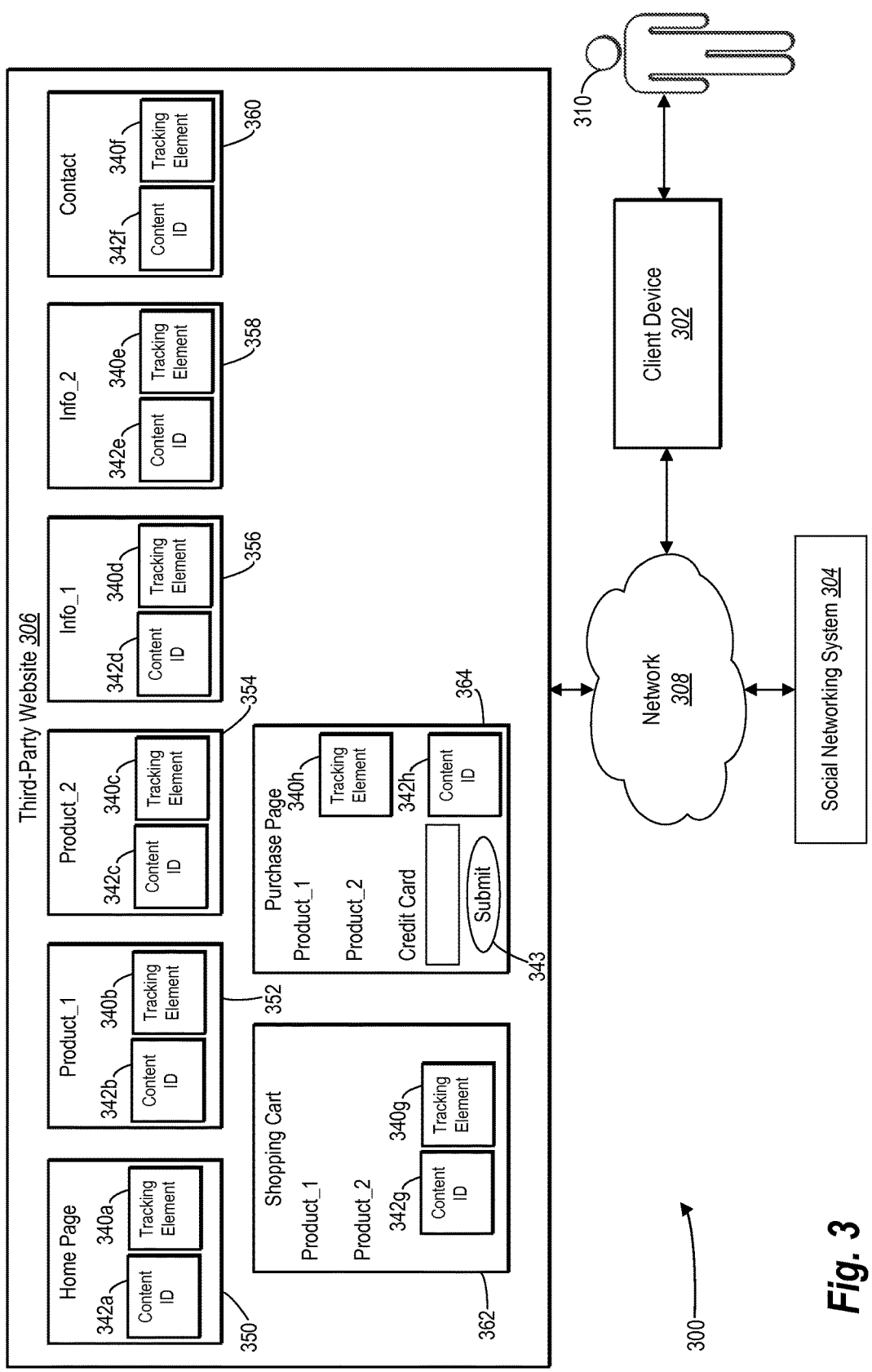
FIG. 3 illustrates a schematic diagram of an example third-party website in accordance with one or more embodiments.
Figure 4A:
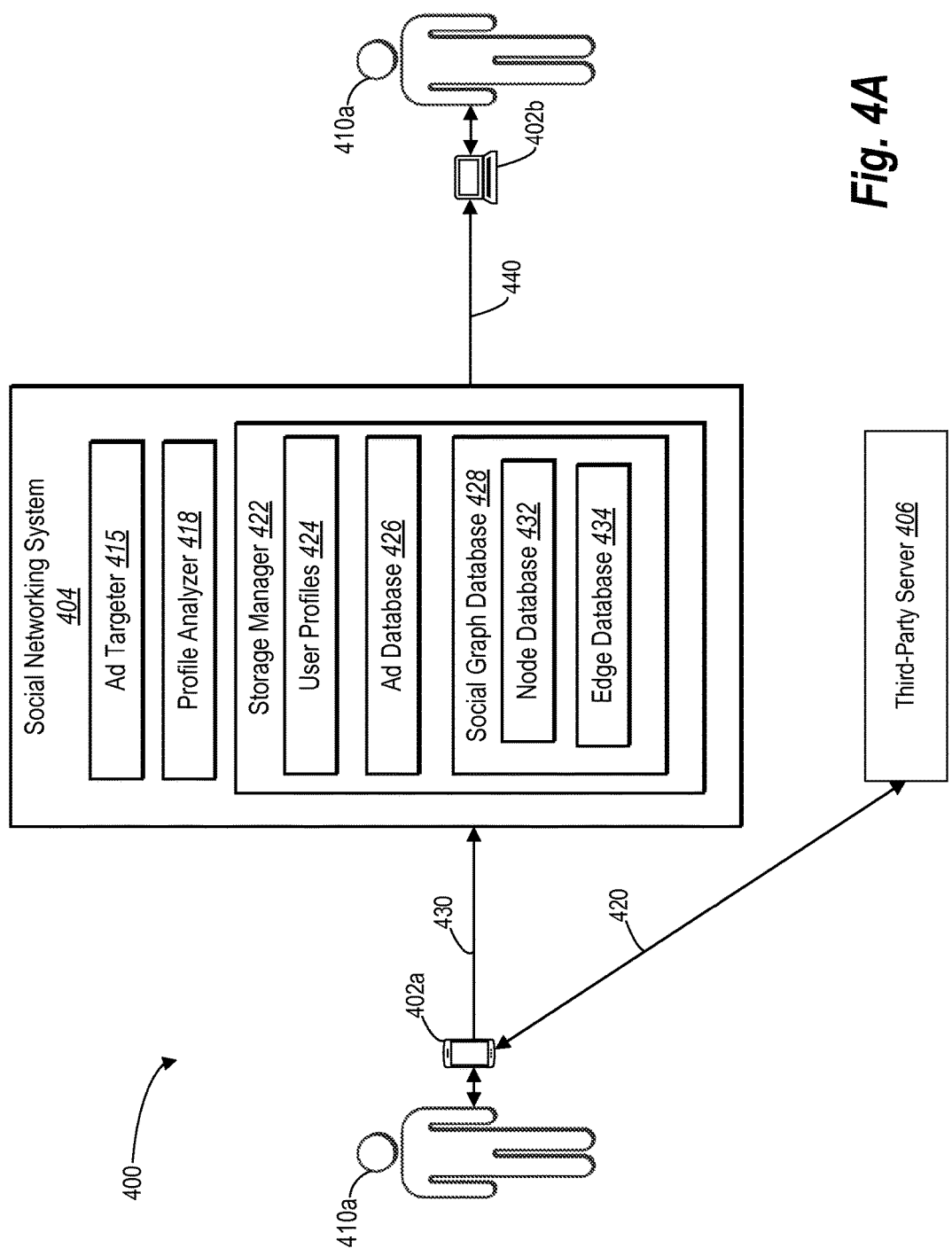
FIG. 4A illustrates a schematic diagram of providing a targeted advertisement using one or more embodiments of an advertisement system as disclosed herein.
Figure 4B:
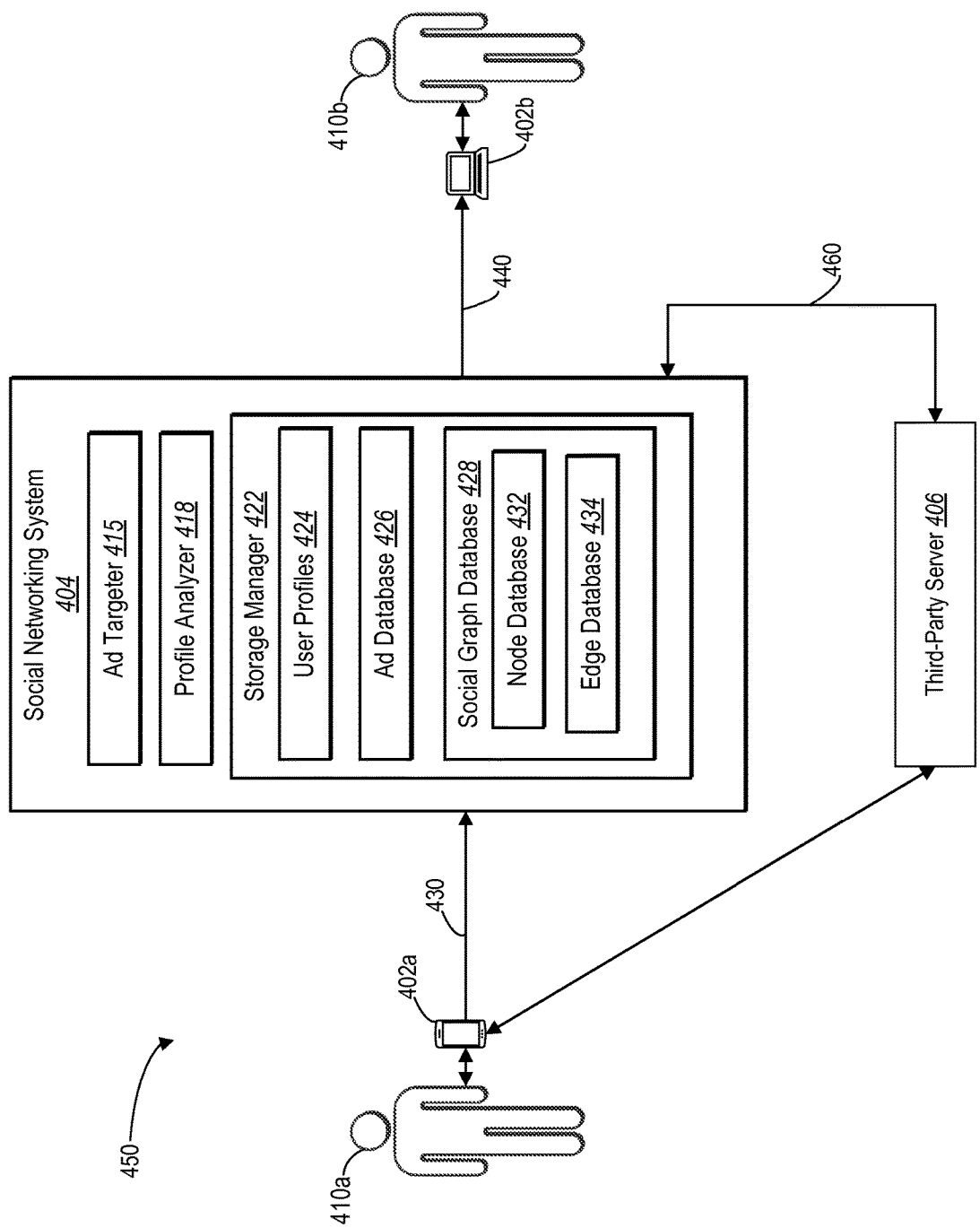
FIG. 4B illustrates another schematic diagram of providing a targeted advertisement using one or more embodiments of an advertisement system as disclosed herein.

The below discussion with respect to FIGS. 2-3 provides details related to example systems and methods that an advertisement system can use to track user activity with respect to third-party content, including identifying specific content and associating the specific content with a user profile corresponding to a specific user to create an augmented profile. Meanwhile, FIGS. 4A-4B provide details related to example systems and methods that an advertisement system can use to provide targeted advertising to one or more users based on augmented profiles. Although FIGS. 2-3 and FIGS. 4A-4B discuss various different components of an advertisement system, it is understood that the components discussed with respect to FIGS. 2 through 4B can be combined into a single advertisement system. In particular, FIGS. 2 and 4A-4B illustrate that various components of an advertising system can be included within a social networking system. In one or more embodiments, the social networking system components discussed with respect to FIGS. 2 and 4A-4B are combined into a single social networking system.

As mentioned, FIG. 2 illustrates a schematic diagram of an advertisement system 200 (or simply, "system 200") in accordance with one or more embodiments. In particular, the system 200 can represent one or more embodiments of the system 100 discussed above with reference to FIGS. 1A and 1B. For example, the client device 202, social networking system 204, and third-party servers 206*a-b*, shown in FIG. 2, can include some or all of the features discussed above with respect to client device 102, social networking system 104, and third-party servers 206*a-b*, respectively.

In general, and as FIG. 2 illustrates, a user 210 can interface with the client device 202 and cause the client device 202 to send and receive electronic information to and from the social networking system 204 and the third-party servers 206*a-b*. For example, the user 210 can use the client device 202 to communicate with one or more server computing devices 212 that provide a social networking system 204, as shown in FIG. 2. In particular, the user 210 can use the client device 202 to communicate with the social networking system 204, such as to post messages/updates, view social networking content (e.g., posts, pictures, messages), interact with content (e.g., "like," "share," or "comment" with respect to the social networking content), search content, etc.

In addition to communicating with the social networking system 204, the user 210 can interact with the client device 202 to communicate with one or more third-party servers 206*a-b*, as shown in FIG. 2. For example, as illustrated in FIG. 2, the user 210 can use the client device 202 to request third-party content 239*a* and 239*b* from third-party servers 206*a* and 206*b*, respectively. The third-party servers 206*a-b*, in response to a request for content, can provide third-party content 239*a-b* to the client device 202 for presentation to the user 210 on the client device 202.

In particular, and as illustrated in FIG. 2, the client device 202 can include a client application 234 that allows the client device 202 to request and receive third-party content 239. For example, in one or more embodiments, the client application 234 may be a web browser application. Alternatively, the client application 234 may be a standalone application having a particular purpose, such as a merchant shopping application, a music application, a streaming video application, a game application, or any other type of application, program or combination of hardware and software that at least in part facilitates receiving third-party content 239*a-b* from the third-party servers 206*a-b*.

Notwithstanding a particular client application 234, in one or more embodiments, the client application may include a content processor 236. For example, the content processor 236 can be a combination of software, hardware, and/or firmware associated with, or accessed by, the client application 234 that processes the third-party content 239*a-b* that the client application 234 receives from the third-partyer servers 206*a-b*. In particular, content processor 236 can process code associated with third-party content 239*a-b* in order to provide the third-party content 239*a-b* to the user 210.

In one or more embodiments, for example, the content processor 236 can include a rendering engine within a web browser application. The rendering engine can render third-party content 239*a* that the client device 202 receives from third-party server 206*a*. For example, in the event that the third-party content 239*a* includes a HTML document, the rendering engine can read the HTML document and render the HTML elements into viewable webpage content. In one or more additional embodiments, the content processor 236 can render, present, play, and/or process various types of third-party content 239, such as digital image content, video content, audio content, and any other type of digital content.

As further illustrated in FIG. 2, the client application 234 can include a user/device identifier 238 (or simply "identifier 238"). Generally, the identifier 238 includes data that identifies the user 210. For example, in one or more embodiments, the identifier 238 can include the user's 210 social networking system user ID that can be used within the social networking system to identify the user 210. Alternatively, the identifier 238 can include a client device ID that is associated with the user 210 within the social networking system 204. For example, given the user's 210 client device ID, the social networking system 204 can lookup the user's 210 social networking system user ID within the social networking system 204. In one or more embodiments, the identifier 238 may include more than one identifier 238 associated with user 210.

In addition to a social networking system user ID or a client device ID, the identifier 238 can also include an application scope ID. An application scope ID is an ID associated with the user 210 of the social networking system that is used for a specific application. For example, with application scope IDs, the ID for the same user will be different between various applications. The application scope ID, however, can be used to identify the user 210, and therefore, can track the user's 210 activity with respect to an application that uses an application scope ID.

Likewise, the identifier 238 can include an anonymous login ID. For example, a third-party server 206 can provide the user 210 the ability to login to the third-party server 206 using an anonymous login generated at the social networking system 204. For example, the user 210 may request to login to a third-party server 206 using an anonymous login. The social networking system 204 requests the user 210 provide permission information to the social networking system 204 to confirm the user's 210 identity. In response, the social networking system 204 provides an anonymous identifier to allow the user 210 to access the third-party server 206 without sharing any personal identification information with the third-party server, or by sharing only a limited amount of personal information if the user prefers. Not withstanding the third-party server 206 not receiving identification information for the user 210, the identifier 238 can include the anonymous identifier, thus allowing the social networking system 204 to associate user's 210 activity using the anonymous identifier with the user's 210 social networking profile.

Irrespective of the type of identifier 238, the location of the identifier 238 on the client device 202 can vary from one embodiment to the next. For example, and as illustrated in FIG. 2, the identifier 238 can be located within the client application 234. In particular, the client application may control, update, and otherwise provide the identifier 238. Alternatively, the identifier 238 may be located on the client device 202, but not necessarily be directly associated with or included within client application 234. For example, client device 202 may maintain the identifier 238 such that several client applications have access to the identifier 238.

In the event that the client application 234 is a web browser, the identifier 238 can be a cookie (e.g., web cookie or browser cookie). In general, a cookie is a small piece of data sent from a source to the client device and stored in the web browser. In on or more embodiments, the cookie includes data that identifies user 210, such as the user's 210 social networking user ID and/or the client device ID. Thus, a cookie can be used as the identifier 238 to provide the ability for the client application to access information regarding the user's 210 identity.

In one or more embodiments, the identifier 238 is a cookie that is associated with a domain that is different from a domain of a web site that the web browser is currently presenting. For example, in one or more embodiments, the identifier 238 is a cookie that is associated with a domain corresponding to the social networking system 204, or in other words, the social networking system 204 placed the cookie within the client application 234 (e.g., when the user 210 accessed the social networking system 204). For instance, the user 210 may have used the client application 234 (e.g., web browser) to request the user's 210 social networking page from the social networking system 204. Along with providing the client application 234 with the user's 210 social networking page, the social networking system 204 also provides a cookie associated with the social networking system that includes the user's 210 identification information.

Although, in the above example embodiment, the identifier 238 can be a cookie that corresponds to the social networking system 204 (e.g., the cookie provides data to the social networking system), the cookie can be activated upon the client application 234 receiving third-party content 239a. For example, the content processor 236 can process third-party content 239a from third party server 206a (e.g., render a web site in a web browser), and in response, the identifier 238 within the cookie, or a copy of the entire cookie itself, is sent to the social networking system 204. Thus, and as will be described in greater detail below, the client device 202 can send user 210 identification information upon the user 210 accessing third-part content 239.

A cookie is only one example of the identifier 238. Alternatively, the identifier 238 can include, but is not limited to, an IP Address associated with the client device 202, a unique device identification number (e.g., mac address) of the client device, URL query strings, and any other known method of storing and/or providing identification information associated with the user 210 via the client device 202.

Additionally, in one or more embodiments, the client application 234 and/or the client device 202 may include multiple identifiers 238 that are each associated with the social networking system 204. In particular, the social networking system 204 can send multiple identifiers 238 to the client device 202 and/or client application 234. In one or more embodiments, the multiple identifiers 238 can each be designed to interact with various different applications and various types of third-party content 239 so that the user's 210 activity on the various different applications and third-party content 239 can be tracked and related to the user 210 within the social networking system 204. For example, a first identifier 238 can be associated with a web browser application, while a second identifier 238 is associated with a mobile application.

Furthermore, one or more embodiments of the advertisement system 204 may not require an identifier. For example, in one or more embodiments, the user 210 may have established an active social networking system 204 session through the client device 202 (e.g., signed into the social networking system 204 through a web browser or social networking system application). At the same time, the user 210 can cause a second client application 234 to request, receive, and process third-party content 239.

In such a case, the social networking system 204 can use the active social networking system session to detect the user's 210 third-party content activity on the client device 202. For example, the social networking system 204 can use a web application that is able to detect the user's 210 third-party content activity. Since the social networking system 204 already knows the identity of the user 210, the social networking system detects the third-party content 239 and associates the third-party content activity with the user 210.

Regardless of the particular embodiment of the client application 234, the user 210 can use the client device 202 to request and receive third-party content 239a-b from one or more third-party servers 206a-b, as illustrated in FIG. 2. Various aspects of the third-party servers 206a-b will be discussed with reference to third-party server 206a, although the various aspects may apply to both third-party servers 206a-b.

In particular, third-party server 206a can include third-party content 239a that is available to send to the client device 202. Third-party content 239 can include any digital content that a third-party server 206a can provide to the client device 202. As discussed in detail above, third-party content can include a web page, digital documents, digital media (images, audio, video), or any other digital content or combinations thereof.

In addition, and as shown in FIG. 2, the third-party content 239a can include a tracking element 240a and a content ID 242a. In general, the tracking element 240a and the content ID 242a are used by the advertisement system 200 to identify the third-party content 239a with which the user 210 interacts using the client device 202. As will be described in further detail below, the system 100 can implement the tracking element 240a using various methods and processes to allow the system 100 to track specific information related to the third-party content 239a.

In one or more embodiments, for example, the tracking element 240a may include one or more tracking pixels (e.g., a JavaScript or another piece of software code) that can cause the client device 202 to send the social networking system 204 information related to the third-party content 239a and the user 210 (e.g., the identifier 238 and the content ID 242a). For example, when the content processor 236 processes the third-party content 240a on the client device 202 (e.g., renders the website), the content processor 236 reads or otherwise executes the JavaScript contained in the tracking pixel, which causes the client device 202 to send the content ID 242 to the social networking system 204.

In addition to the above, the tracking element 240a can include one or more tracking pixels, as described above, that include JavaScript that reads cookies associated with the third-party content 239a. For example, the third-party server 206a can provide a cookie on the client device 202 that the third-party server 206a use to log user interactions. Therefore, upon the JavaScript accessing data within the cookies, the JavaScript can identify the user's 210 interactions on with respect to the third-party content 240a and/or the third-party server 206a. In one or more embodiments, the JavaScript further causes the cookie, or data within the cookie, to be sent to the social networking system 204.

In one or more embodiments, the tracking element 240a can be processed on the third-party server 206a side. For example, the social networking system 204 can provide a plugin for the third-party server 206a that would automatically send user identification information and user activity information related to the third-party content 239a on the third-party server 206a to the social networking system 204. In particular, the third-party server 206a can send the social networking system 204 user activity data on a user-per-user basis. In such an embodiment, for example, the tracking element 240a on the social networking system 204 can call an API on the social networking system 204 to report a user and an interaction on the third-party server 206a, where the user identifier can be an email address, phone number, social networking user ID, or any other user identification information that the third-party server 206a maintains.

Alternatively, or additionally, the tracking element 240a may be in the form of a software development kit (SDK) or other code executable on mobile device platforms. In one or more embodiments, for example, the tracking element 240a could be a tracking pixel that is integrated into a third-party mobile application. Upon processing the tracking pixel, the third-party application can call an API provided by the SDK and send the user identifier and user activity related to the third-party application to the social networking system 204. As with other embodiments, the user identifier can be an email address, phone number, social networking user ID, or any other user identification information.

In some instances, the third-party that controls the third-party content can send a list of user identification information and corresponding user activity on third-party content to the social networking system 204 to define a custom audience. The social networking system 204 can then target the custom audience with advertising from the third-party. Additional information relating to generating custom audience groups can be found in U.S. patent application Ser. No. 12/977,038, entitled Determining Advertising Effectiveness Outside of a Social Networking system, and U.S. patent application Ser. No. 14/177,300, entitled Generating User Audience Groups to Facilitate Advertisement Targeting.

Additional details with respect to the above embodiments of the tracking element 240a will become apparent in light of the below discussion. For instance, regardless of a particular embodiment of the tracking element 240a, the tracking element 240a can be included within the third-party content 239a such than when the third-party server 206a sends the third-party content 239a to the client device 202, the tracking element 240a is also sent to the client device 202. For example, the tracking element 240a can be included in the markup language of a web site. Thus, when the content processor 236 processes the third-party content 239a (e.g., renders the content), the content processor 236 also reads and executes the tracking element 240a, causing the client device 202 to send an electronic communication to the social networking system 204 that includes identification about the user 210 and the third-party content 239a for purposes of the social networking system 204 tracking the user's 210 third-party content activity.

As FIG. 2 further illustrates, and as briefly described above, the third-party content 239a can also include, or be associated with, a content ID 242a. The content ID 242a can be a unique identifier that corresponds to the third-party content 239a. For example, the content ID 242a can comprise an alphanumeric code that corresponds with a particular product(s), category of products, merchant, topic, or combination of the above. The third-party content 239a can include the content ID 242a such that the third-party server 206a sends the content ID 242a to the client device 202 along with the third-party content 239a. For example, in one or more embodiments, the content ID 242a can be embedded within the tracking element 240a.

In one or more embodiments, the third-party provider (e.g., a merchant) assigns the content IDs 242a. For example a merchant can assign each of its products a unique content ID. The merchant can then associate the unique content ID with each piece of third-party content (e.g., web page) that corresponds to a particular product. The merchant can provide a list of content IDs and corresponding products to the social networking system 204. Therefore, given the content ID 242a associated with third-party content 239a, the social networking system 204 can identify a particular product, as will be discussed in detail below.

In addition to identifying a particular product, topic, and/or merchant, the content ID 242a can also identify features of the third-party content 239a that may indicate a user's level of interest in the third-party content 239a. For example, the content ID 242a can be associated with a "shopping cart" web page that indicates the user has placed one or more products into an online shopping cart. Similarly, the content ID 242a can be associated with a "purchase confirmation" web page that indicates the user has purchased one or more products via an online purchasing process.

In one or more embodiments, the third-party server 206a can dynamically generate the content ID 242a to indicate information about the third-party content 239a. For example, a first part of the content ID 242a may indicate that the web page is a "shopping cart" web page. In addition, a second part of the content ID 242a can indicate one or more products that are currently in the shopping cart. Thus, as the user 210 adds or removes items from the shopping cart, the content ID 242a associated with the shopping cart web page is updated to reflect the products currently in the shopping cart. The third-party content 239a may use various other methods of generating and assigning the content ID 242a to the third-party content 239a, such as using UPC codes, or other previously defined identifiers, as the content ID 242a.

Regardless of the particular form of the content ID 242a, the system 200 can use the content ID 242a to allow the social networking system 204 to identify the third-party content 239a that the user 210 accesses. For example, FIG. 2 illustrates an example embodiment of the client device 202 providing the social networking system 204 with activity identification data that allows the social networking system 204 to identify and associate a user's 210 third-party content activity with a user's social networking profile.

In particular, FIG. 2 shows step 1a can include the user 210 causing the client application 234 to send a request to the third-party server 206a for third-party content 239a. In response, FIG. 2 illustrates step 2a that includes the third-party server 206a providing the client application 234 the third-party content 239*a*. As explained above, the third-party content 239*a* can include the tracking element 240*a* and the content ID 242*a*.

Upon receiving the third-party content 239*a*, the content processor 236 within the client application 234 can process the third-party content 239*a*. As part of processing the third-party content 239*a*, the content processor 236 can process the tracking element 240*a*. The tracking element 240*a* can cause the client application 234 and/or client device 202 to identify the identifier 238 and the content ID 242*a* associated with the third-party content 239*a*. In addition, FIG. 2 illustrates step 3*a* that shows that the tracking element 240*a* can cause the identifier 238 and the content ID 242*a* to be sent to the social networking system 240. Thus, the client device 202 can send the social networking system 204 activity identification data that indicates the user's 210 activity with respect to the third-party content 239*a*.

As further illustrated in FIG. 2, the system 200 can follow the same or similar process for providing the social networking system 204 with the user's 210 activity with respect to third-party content 239*b*. For example, in response to a request from the client device (step 1*b*) third-party server 206*b* can send the client device 202 the third-party content 239*b* that includes the tracking element 240*b* and the content ID 242*b* (step 2*b*). The content processor 236 can then process the third-party content 239*b*, including the tracking element 240*b*, which causes the client device 202 to send the identifier 238 and the content ID 242*b* to the social networking system 204 (step 3B). Therefore, using the above principles, the system 200 can provide systems and methods of associating the user 210 with specific third-party content 239, regardless of the source of the third-party content.

In one or more embodiments, the social networking system 204 can use the activity identification data (e.g., identifier 238 and content ID 242) to augment the user's 210 social networking profile. For example, as shown in FIG. 2, the social networking system 204 may include, but is not limited to, a profile builder 216 that includes a content identifier 218, a user identifier 220, a content ID database 222, and a user/device ID database 224. In addition, the social networking system 204 can include a user profile database 226 that maintains multiple social networking user profiles, including one or more augmented profiles 227.

In one or more embodiments, the profile builder 216 can process the activity identification data to generate third-party content activity data. For example, the profile builder 216 can parse, analyze or otherwise process the activity identification data to determine or identify the identifier 238 and the content ID 242. For example, the profile builder 216 can identify the identifier 238 associated with the user 210 from within the activity identification data. In one or more embodiments, the identifier 238 is simply the user's 210 social networking ID, and thus no further processing is needed. Alternatively, the identifier 238 may be a device ID that is associated with a particular user. In such an instance, the profile builder 216 can provide the user identifier 220 the device ID, and the user identifier 220 can use the device ID to perform a lookup with the user/device ID database 224 to correlate the device ID with a particular user ID within the social networking system 204.

Similarly, the profile builder 216 can process the content ID 242 included within the activity identification data. For example, the profile builder can provide the content ID 242 to the content identifier 218. The content identifier 218 can perform a lookup within the content ID database 222 to locate a particular product, topic, merchant, or other information that may be associated with a particular content ID 242.

In this way, the profile builder 216 can use the activity identification data sent from the client device 202 to generate third-party content activity data 232 that includes specific details relating to the third-party content 239 (e.g., specific products, specific activities with respect to the product, specific topics, specific merchants, etc.) that is associated with a particular social networking user ID that corresponds with user 210. The profile builder 216 can then augment the third-party content activity data 232 within a user profile associated with the particular social networking user ID.

For example, and as illustrated in FIG. 2, profile builder 216 updates the augmented profile 227 associated with user 210. As shown in FIG. 2, the augmented profile 227 can include user information 228, social networking activity data 230, and third-party content activity data 232. In one or more embodiments, user information 228 can include personal information about the user 210, such as age, date of birth, residence information (e.g., address), phone numbers, family information, education, employment, etc.

In addition, and as FIG. 2 illustrates, the augmented profile 227 can include social networking activity data 230. In one or more embodiments, social networking activity data 230 can include data associated with the user's 210 activity within the social networking system 204. For example, social networking activity data can include the user's contacts (e.g., "friends"), newsfeed content, message content, social networking content viewed, commented on, or "liked," links clicked on, social networking pages visited, games played, location check-ins, posts (including text, pictures, and videos), current geographic locations, groups, and any other social networking activity.

Furthermore, and as mentioned above, the augmented profile 227 can include third-party content activity data 232. The third-party content activity data 232 can include data that corresponds to the user's 210 activity with respect to content outside of the social networking system. In one or more embodiments, the profile builder 216 can augment the third-party content activity data 232 within the augmented profile 227 each time the social networking system receives activity identification data. For example, and as explained above, the profile builder 216 can generate third-party content activity data 232 in response to receiving activity identification data from the client device 202.

More particularly, the activity identification data can include a content ID and a user ID. The profile builder, using the systems and methods discussed above, can generate the third-party content activity data using the content ID and user ID. For example, the content ID may simply be an identification number, while the third-party content activity data 232 actually includes a product type, brand, model, etc. In addition, the third-party content activity data can include the date and time the user interacted with the third-party content, the device that the user 210 used to interact with the third-party content, and details about the user interaction (e.g., browsing activity, shopping cart activity, purchasing activity, etc.

As the user 210 continues to interact within the social networking system, the profile builder 216 (or another similar component within the social networking system 204) can continue to augment and update the social networking activity data 230 within the user's 210 augmented profile. Similarly, and in addition to activity within the social networking system, the profile builder 216 can continue to augment and update the third-party content activity data 232 with information associated with the third-party content 239 with which the user 210 interacts outside of the social networking system.

Therefore, over time, each user of the social networking system 204 is associated with an augmented profile that includes a wealth of user activity data with respect to both social networking activity data 228, as well third-party content activity data 232. Moreover, the augmented activity data is associated with user information 228, so that in many or most cases, an actual user identity, with known user characteristics, is associated with the augmented activity data. The social networking system 204, in cooperation with one or more merchants, can access, analyze, and otherwise use the augmented profiles to provide effective targeted advertising to the user's of the social networking system.

As discussed above with respect to FIG. 2, the system 200 can be used with various types of third-party content. FIG. 3, for example, illustrates one or more embodiments of third-party content that can be incorporated within an advertisement system 300 (or simply "system 300"). In particular, a user 310 can use a client device 302 to interact with a third-party website 306 and social networking system 304, and described above with reference to FIGS. 1A-2. For example, the third-party web site 306 that can represent a merchant website (e.g., see FIG. 1B). Regardless of the particular content within the third-party web site 306, the principles described with reference to the third-party web site 306 are applicable to any third-party content disclosed herein.

As further illustrated in FIG. 3, the third-party web site 306 can include multiple web pages 350, 352, 354, 356, 358, 360, 362 and 364 (collectively "web pages"). Each of the web pages can include particular content or information that is distinct from the other web pages. For example, the home page 350 and contact page 360 may include general information about a particular merchant. Moreover, product 1 page 352 and product 2 page 354 may include general information directed at particular products. Likewise, info 1 page 356 and info 2 page 358 can include detailed information related to products 1 and 2, respectively. In addition, third-party website 306 can include a shopping cart page 362 indicating products the user 310 has placed into a virtual shopping cart, and a purchase page 364 indicating products the user 310 purchases through the third-party website 306.

As further illustrated in FIG. 3, each web page can include a tracking element 340a-h as discussed above with respect to FIG. 2. In addition, each web page can include a content ID 342a-h, where each content ID 342a-h is a unique identifier associated with the contents of the corresponding web page. Thus, when the client device 302 receives a particular web page from the third-party web site, the client device 302 processes the tracking element associated with the particular web page, and sends activity identification information, including the content ID associated with the particular web page, to the social networking system 304, and the user's 310 augmented profile is updated with third-party content activity data, as discussed above in detail.

Due to each web page being associated with a unique content ID, it is possible to track the level of interest a user may have in a particular product. For example, if the third-party activity data only indicates that the user interacted with the homepage 350, the system 300 may indicate a general interest in the merchant's products. Additionally, however, if the third-party activity data indicates that the user interacts with the product 1 page, the system 300 can infer that the user 310 shows more than a general interest with respect to product 1. Moreover, if the user 310 further interacts with info 1 page 356, the system 300 can further infer that the user 310 shows an additional level of interest in product 1 because the user 310 took the time to further research details relating to product 1. The same would be true with respect to the user's 310 interaction with product 2 page 354 and info 2 page 358.

In addition, the system 300 can infer an even greater level of interest with respect to products 1 and 2 if the user 310 decides to place the products into a shopping cart, as illustrated in the shopping cart page 362. For example, upon placing products 1 and 2 into the shopping cart, the third-party website 306 can provide a shopping cart page 362 that has a content ID that indicates a shopping cart page 362, as well as indicates the products that are included within the shopping cart. Thus, the system 300 can infer that the user 310 has a fairly high level of interest in products 1 and 2. Moreover, and as illustrated in FIG. 3, the system 300 can conclude user interest in a products 1 and 2 upon the user 310 purchasing the products 1 and 2, as indicated on the purchase page 364.

Therefore, in addition to providing tracking information across various third-party content providers, FIG. 3 illustrates that the particular third-party content with which the user 310 interacts from a single third-party content provider can indicate varying levels of user 310 interest in the products, topics, merchants, and/or other information found within the third-party content.

Notwithstanding the particular third-party content with which a user interacts, one or more embodiments of the advertisement system can use augmented profiles of the social networking users to identify targeted advertising opportunities. For example, FIGS. 4A-4B illustrate an advertisement system 400 (or simply "system 400") that includes a social networking system 404 in communication with client device 402a associated with a user 410a. The system 400 can include all of the features and characteristics disclosed with reference to systems 100, 200, and 300 disclosed above.

In addition, FIG. 4A illustrates that the social networking system 404 can include an ad targeter 415, a profile analyzer, and a storage manager 422 that includes users profiles 424, an ad database 426, and a social graph database including a node database 432 and an edge database 434. In one or more embodiments, for example, the user profiles 424 include augmented user profiles (e.g., profiles including social networking activity data and third-party content activity data as discussed above with reference to FIG. 2).

As mentioned, the social networking system 404 can include an ad targeter 415. The ad targeter 415 can determine which ads to provide to which users based on one or more characteristics of one or more augmented profiles. In particular, the ad targeter 415 can identify a targeted advertising opportunity for a particular user, or group of users, based on particular ads, or ad campaigns, located in the ad database. For example, the ad targeter 415 can identify that the ad database 426 includes an ad campaign associated with a particular product. The ad targeter 415 can then attempt to identify users that may be interested in the particular product based on one or more characteristics of the users' augmented profiles.

As an illustration, ad targeter 415 can identify an ad for a new movie release. Upon identifying the ad for the new movie, the ad targeter 415 can generate or obtain one or more characteristics of a user that may be interested in the new movie. In one or more embodiments, the ad targeter 415 can automatically generate characteristics that are related to users that may be interested in the new move based on characteristics of the new movie. Alternatively, or additionally, the merchant and or social networking system provider can manually customize or select the one or more characteristics that may be associated with users interested in the new movie release.

For example, the ad targeter 415 may identify other movies that are similar to the new movie that a user has viewed, identify third-party content associated with a web site dedicated to the new action movie release (e.g., such as trailers), and/or identify user "likes" with respect to social networking content dedicated to the new movie. Thus, the ad targeter 415 generates or obtains characteristics, or combinations of characteristics, that may be found in the augmented profiles and that indicate a potential level of user interest in the new action movie. Once a user is identified as having a predefined level of interest, the ad targeter 415 can send the ad relating to the new movie to the client devices of the identified users, as will be discussed in more detail below.

In order to identify users as targets of a particular targeted advertisement, the ad targeter 415 may sends the list of characteristics to the profile analyzer 418, as illustrated in FIG. 4A. In general, the profile analyzer 418 analyzes the user profiles 424 (e.g., the augmented user profiles) to identify users or groups of users that match a threshold level of characteristics provided by the ad targeter 415. In one or more embodiments, the profile analyzer 418 can perform relatively simple analysis in determining users that may be interested in a particular product. For example, in one or more embodiments the profile analyzer 418 may simply identify any user that has accessed particular third-party content. In such an example, the profile analyzer 418 can simply return a list of users that have accessed the particular third-party content to the ad targeter 415, and the ad targeter 415 can provide a targeted ad from the ad database 426 to each of users within the list of users.

Alternatively, or additionally, the profile analyzer 418 can perform sophisticated and in-depth analysis in the process of identifying users as targets for a particular targeted advertisement. For example, the profile analyzer 418 can analyze augmented profiles for user activity, including third-party content activity, associated with products that are similar (e.g., look-alike products) to the product featured within the targeted advertisement. Additionally, the profile analyzer 418 can analyze and determine a level of interest a particular user has in the product based on the number activity data items that correspond to the product or similar products.

Moreover, the profile analyzer 418 can compare an augmented user profile that demonstrates an interest in the product with other augmented user profiles to locate users that are similar to the user that demonstrates an interest in the product. For example, user A's augmented profile may indicate that user A has a high level of interest in a product based on third-party content activity data indicating that user A interacted with the product web page. User B's augmented profile, however, may not include any direct indication that user B would be interested in the product. The profile analyzer 418, however, can analyze and compare user B's augmented profile with user A's augmented profile and determine that user A and user B share similar interests. Based on user A and user B's similar augmented profiles, the profile analyzer 418 can identify user B as a potential target for a targeted advertisement of the product.

In addition to using the augmented user profiles, profile analyzer 418 can also access the social graph database 432 to further identify potential target users. For example, the social graph database 432 can include a node database 432 comprising nodes of users, nodes for topics, nodes for concepts, and nodes for products. In addition, the social graph database 432 can include an edge database 434 comprising relationships between nodes and/or actions occurring within the social networking system 404. Further detail regarding social graphs, nodes, and edges is presented below with respect to FIG. 9.

Due to the wealth of information associated with each user within the social networking system, the profile analyzer 418 can use a variety of techniques to identify various users that meet various levels of interest for a particular product. In short, the profile analyzer 418 can analyze any combination of augmented profile information, compare any number of augmented profiles, and generally use any available information within the augmented profiles to identify potential target users for a targeted advertisement. Therefore, the system 400 allows for the creation of a custom user audience for a particular targeted advertisement.

In addition to the above, the profile analyzer 418 can use a scoring process when identifying users that may have an interest in a particular targeted advertisement. For example, the profile analyzer 418 can compare a user's augmented profile with a baseline, and then calculate a score or rank that correlates with the likelihood the user is interested in a particular product. In one or more embodiments, the profile analyzer 418 can determine the top one-thousand (or other predefined number) of users that indicate the strongest interest in a particular product. In this way, a merchant can use the social networking system 404 to provide a targeted advertisement to a defined group of users (e.g., for a defined cost) that have the strongest interest in the merchant's product.

Although the profile analyzer 418 can analyze user augmented profiles at a particular instant in time, the profile analyzer 418 can also continue to analyze user augmented profiles to identify users that may not have demonstrated an interest in a particular product at a first period of time, but later demonstrated an interest in the product based on additional user activity with respect to social networking content and/or third-party content.

In addition to the above examples, FIG. 4A illustrates one or more example embodiments in which the system 400 can remarket a product cross-devices to a user 410a based on the user's 410a activity with respect to third-party content received from third-party server 406. For example, and as shown in FIG. 4A, the user 410a can interact with third-party content 420 on the third-party server 406 with a first client device 402a. Upon interacting with the third-party content, the first client device 402a can send activity identification data 430 (as discussed above with respect to FIG. 2) to the social networking system 404, and the social networking system can augment the user's 410a profile with third-party content activity data representing the user's interest in a product associated with the third-party content.

The ad targeter 415 and/or profile analyzer 418 can identify that the user 410a has an interest in the product and the ad targeter 415 can determine to provide a targeted advertisement with respect to the identified product. In particular, and as illustrated in FIG. 4A, the ad targeter 415 can provide a targeted advertisement 440 related to the product to the user 410a by way of a second client device 402b. For example, in one or more embodiments, the profile analyzer 418 can determine the user 410a added the identified product to a shopping cart while using the first client device 402a, but that the user 410a did not purchase the product. At a later time, when the social networking system 404 indicates that the user 410a connects to the social networking system 404 using the second client device 402b, the ad targeter 415 can provide a targeted advertisement that includes a link to a landing page that allows the user 410a to complete the purchase of the product the user 410a placed in the shopping cart.

FIG. 4B illustrates another example embodiment of system 400. In contrast to FIG. 4A, FIG. 4b illustrates an example of augmenting a user profile of a first user 410a based on the first user's 410a activity with respect to third-party content, and then providing a targeted advertisement to a second user 410b based on an analysis of the augmented profile. For example, the first user 410a can interact with third-party content on the third-party server 406 via the client device 402a. The client device, in turn, can provide activity identification data 430 to the social networking system 404, and the social networking system 404 can augment the user's 410a user profile with third-party content activity data representing the user's 410a activity.

In addition, the ad targeter 415 and/or profile analyzer 418 can identify a product associated with the augmented profile of the user 410a based on the third-party content activity data. In addition, the profile analyzer 418 can analyze or compare the augmented profile of the user 410a with other user's profiles to identify one or more look-alike users that, based on their similarity with the user's 410a augmented profile, may likely have a similar interest in the identified product. For example, profile analyzer 418 can identify a second user 410b that is sufficiently similar with user 410a (e.g., shares one or more characteristics with user 410a).

After identifying user 410b as a look-alike target user, the profile analyzer can send the user's 410b user ID to the ad targeter 415. The ad targeter 415 can access a targeted advertisement associated with the identified product from the ad database 426, and provide a client device 402b associated with the second user 410b with a targeted advertisement 440 to present to the second user 410b. Thus, using this method, or similar methods, third-party content activity from one user can be analyzed to provide targeted advertisements to other users within the social networking system 404.

Figure 5:
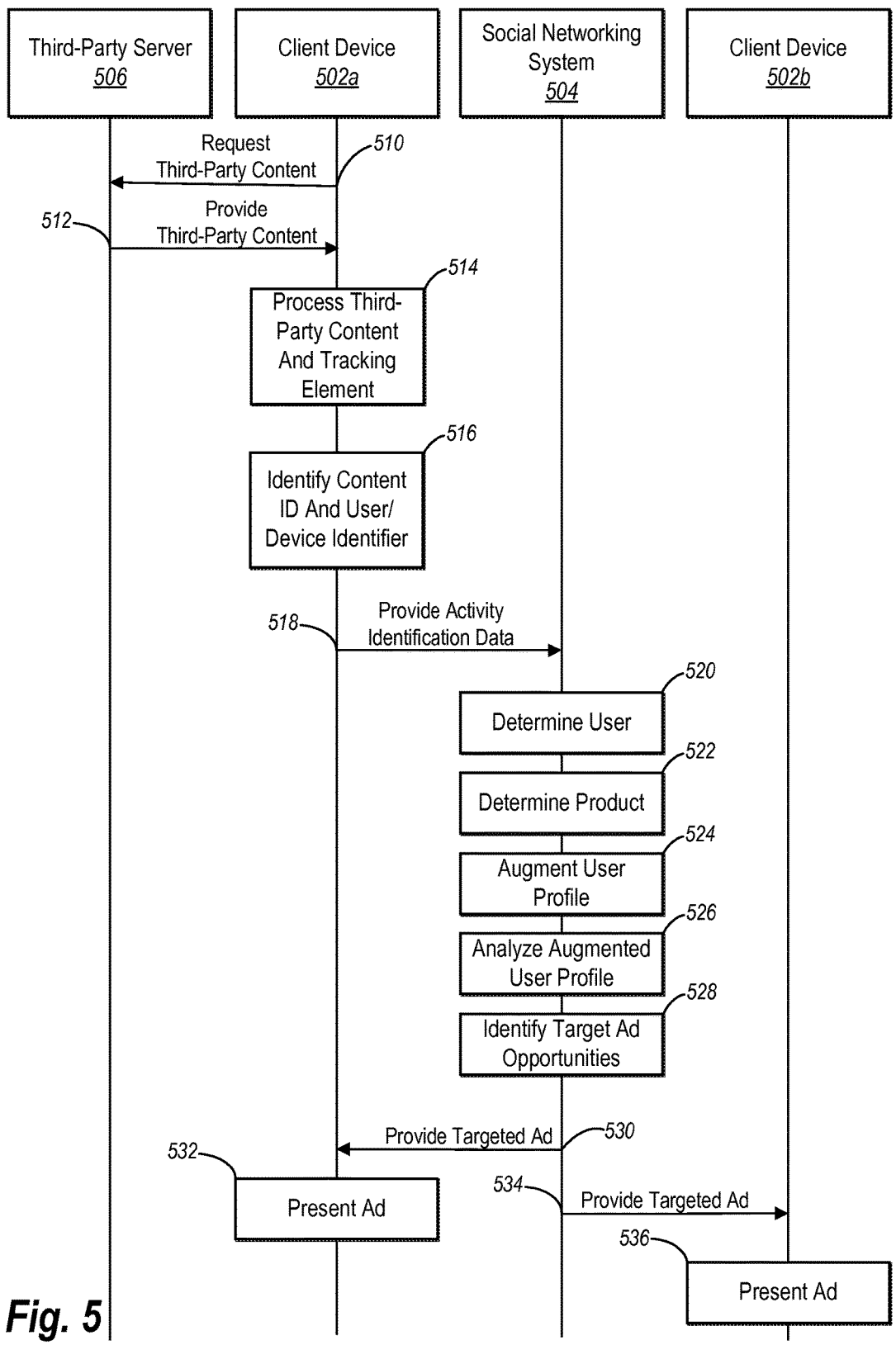
FIG. 5 illustrates a process flow diagram of providing a targeted advertisement in accordance with one or more embodiments.

As an example summary of a targeted advertisement process that uses one or more embodiments of the advertisement systems discussed above, FIG. 5 illustrates an example process diagram of providing a targeted advertisement to one or more users of a social networking system. In particular, FIG. 5 illustrates example steps, processes, and methods performed by and between a third-party server 506, client devices 502a and 502b, and a social networking system 504. For example, third-party server 506, client devices 502a and 502b, and social networking system 504 can include one or more characteristics and features discussed above with respect to FIGS. 1-4B.

As illustrated in FIG. 5, a client device 502a can request third-party content 510 from the third-party server 506. In response the receiving the request for third-party content 510, the third-party server 506 can provide the client device 502a the third-party content 512. For example, and as explained above, the client device 502a may be requesting a web page, application, digital media, or any other type of third-party content, and the third-party server 506 may, in response to the request, provide the requested third-party content.

Upon receiving the third-party content, the client device 502a can process the third-party content and tracking element 514, as illustrated in FIG. 5. For example, and as explained above, the third-party content can include a tracking element (e.g., tracking pixel) that when processed causes the client device (and/or a client application) to identify specific information and send the specific information to the social networking system. In particular, and as further illustrated in FIG. 5, the client device can identify a content ID and a user/device identifier upon processing the tracking element. As FIG. 5 further illustrates, the client device 502a can provide activity identification data to the social networking system 518. For instance, the activity identification data can include the identified content ID and user/device identifier, as explained in detail above with respect to FIG. 2.

Upon receiving the activity identification data, FIG. 5 illustrates that the social networking system 504 can determine a user 520, and a product 522, based on the activity identification data. For example, the social networking system 504 can correlate the content ID with a product, and similarly coordinate a device ID with a known user ID within the social networking system 504. After determining a user ID and a product 522, the social networking system has translated the activity identification data into third-party content activity data.

As FIG. 5 illustrates, the social networking system 504 can augment the user profile 524 with the third-party content activity data. In addition, the social networking system can analyze the augmented user profile 526 to determine user interests and to identify potential targeted advertising opportunities 528, as illustrated in FIG. 5. In on or more embodiments, the social networking system 504 can identify a targeted ad opportunity related to the user associated with the client device 502a (e.g., the user that originally interacted with the third-party content). In such an example, the social networking system 504 can provide a targeted advertisement 530 to the client device 502a (e.g., through a social networking deliver mechanism), and the client device 502a can present the advertisement 532 to the user.

Alternatively, or in additionally, the social networking system 504 can identify a targeted advertisement opportunity with respect to a second user associated with client device 502b. In such an example, the social networking system 504 can provide a targeted advertisement 534 to the client device 502b, and the client device 502b can present the targeted advertisement to the user associated with the client device 502b. Thus, FIG. 5 illustrates that third-party content activity of one user can be used to identify targeting advertisement opportunities for not only the user that interacted with the third-party content, but also to other users within the social networking system that are related to some extent or another with the user that interacted with the third-party content, as explained above in detail.

FIGS. 1-5, the corresponding text, and the examples, provide a number of different systems and devices for facilitating purchases of commerce applications. In addition to the foregoing, one or more embodiments can be described in terms of flowcharts comprising acts and steps in a method for accomplishing a particular result. For example, FIGS. 6-7 illustrate flowcharts of exemplary methods in accordance with one or more embodiments.

Figure 6:
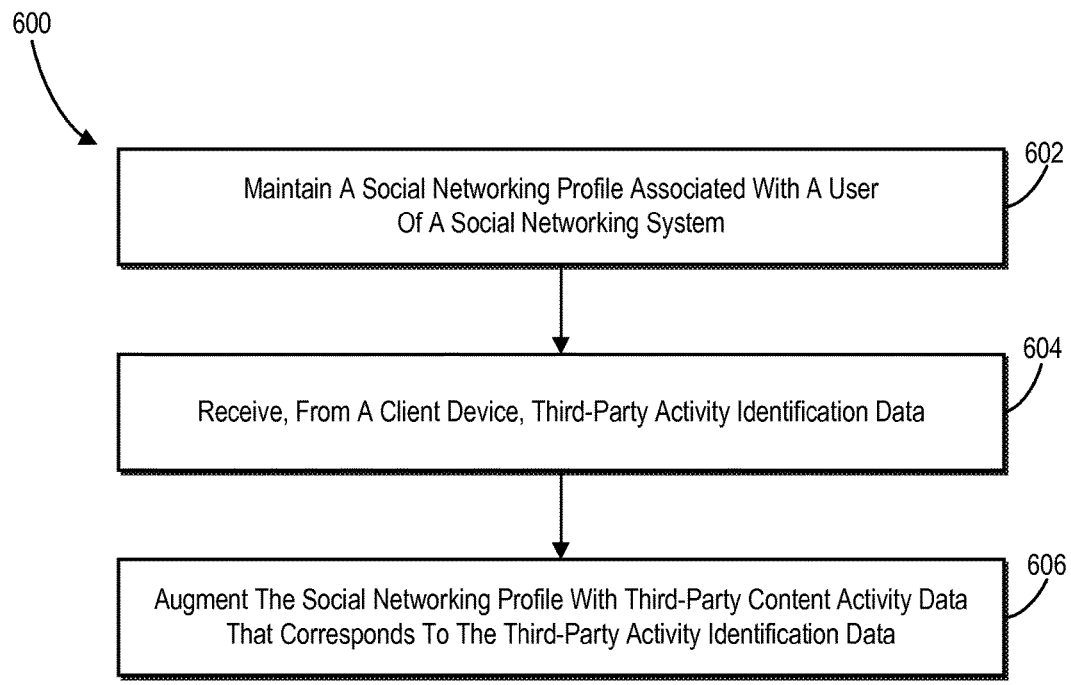
FIG. 6 illustrates a flowchart of an exemplary method for augmenting a social networking profile of a user based on third-party content activity outside of a social network.
Figure 7:
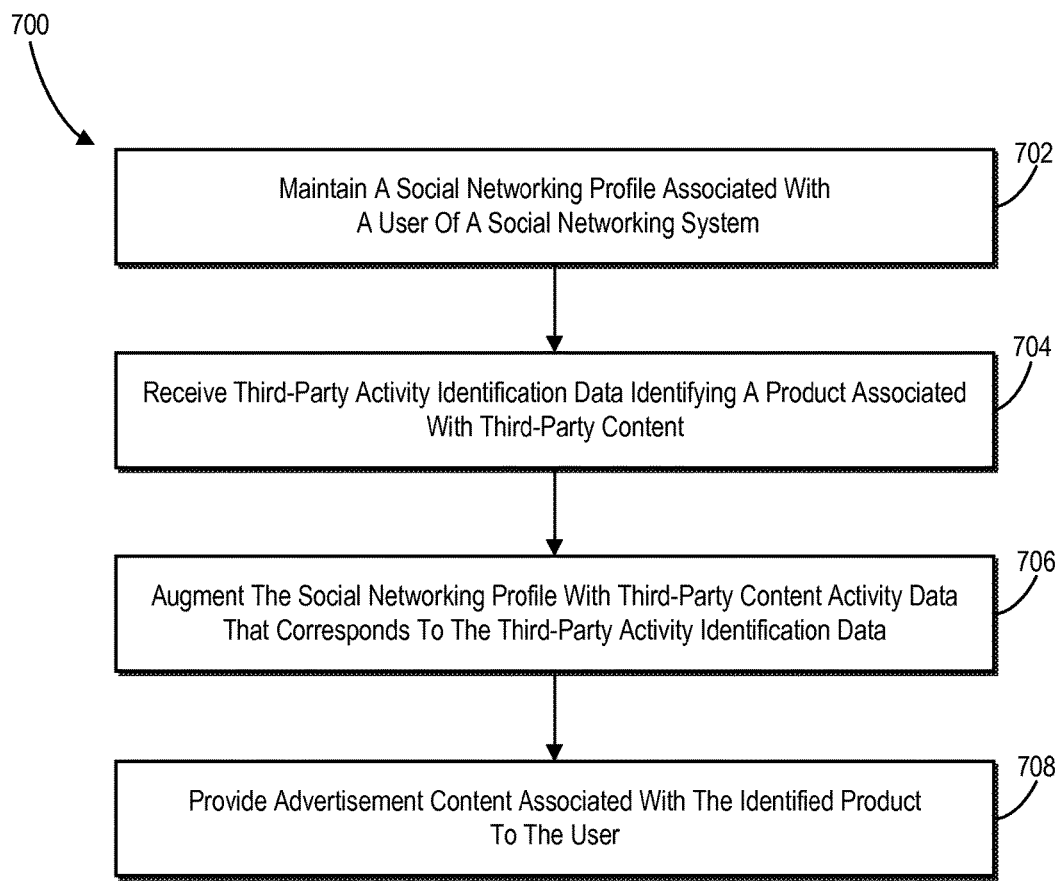
FIG. 7 illustrates a flowchart of exemplary method for augmenting a social networking profile for advertising targeting a user with a product based on third-party content activity.

FIG. 6 illustrates a flowchart of an exemplary method 600 for augmenting a social networking profile of a user based on third-party content activity outside of a social network. The method 600 may include an act 602 of maintaining a social networking profile associated with a user of a social networking system. In particular, act 602 can comprise maintaining, using at least one processor, a social networking profile associated with a user of a social networking system, the social networking profile comprising personal information associated with the user and social networking activity data representing activity of the user within the social network system. For example, a social networking profile can include user information, social networking activity data, and third-party content activity data.

The method 600 may also include an act 604 of receiving, from a client device, third-party activity data. In particular, act 604 can comprise receiving, from a client device, activity identification data corresponding to activity of the user outside of the social networking system. In one or more embodiments, for example, the activity identification data can include a content ID and a user ID and/or a device ID. The activity identification data can be processes to generate third-party content activity data that corresponds to specific content with which a specific user interacted.

The method 600 may further include an act 606 of augmenting the social networking profile with third-party content activity data that corresponds to the third-party activity identification data. For example, act 606 can comprise augmenting, using the at least one processor, the social networking profile of the user with third-party content activity data that corresponds to the activity identification data. The third-party content activity data, for example, can include an particular product, topic, or interest that is now associated with a user based on the user's interaction with the third-party content.

Referring now to FIG. 7, a flowchart of an example method 700 of providing a targeted advertisement illustrated. As shown, method 700 can include an act 702 of maintaining a social networking profile associated with a user of a social networking system. In particular, act 702 can comprise maintaining, using at least one processor and on at least one server device, a social networking profile associated with a user of a social networking system.

Furthermore, method 700 can include an act 704 of receiving third-party activity identification data identifying a product associated with third-party content. In particular, act 704 can comprise receiving, from a client device, third-party activity identification data that includes a content identifier that corresponds with a product associated with third-party content with which the user interacts outside of the social networking system.

In addition, method 700 can include an act 706 of augmenting the social networking profile with third-party content activity data that corresponds to the third-party activity identification data. In particular, act 706 can include augmenting the social networking profile associated with the user with third-party content activity data that corresponds to the third-party activity identification data.

Moreover, method 700 can include an act 708 of providing advertisement content associated with the identified product to the user. In particular, act 708 can comprise providing, within the social networking system, advertisement content associated with the identified product to the user. For example, act 708 can include providing an advertisement to the user using one or more social network delivery mechanisms, such as posts, messages, newsfeed, etc.

One or more embodiments may comprise or utilize a special purpose or general-purpose computer including computer hardware, such as, for example, one or more processors and system memory, as discussed in greater detail below. Embodiments may also include physical and other computer-readable media for carrying or storing computer-executable instructions and/or data structures. In certain particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, example embodiments can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of one or more embodiments. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the one or more embodiments may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. One or more embodiments may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Example embodiments can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
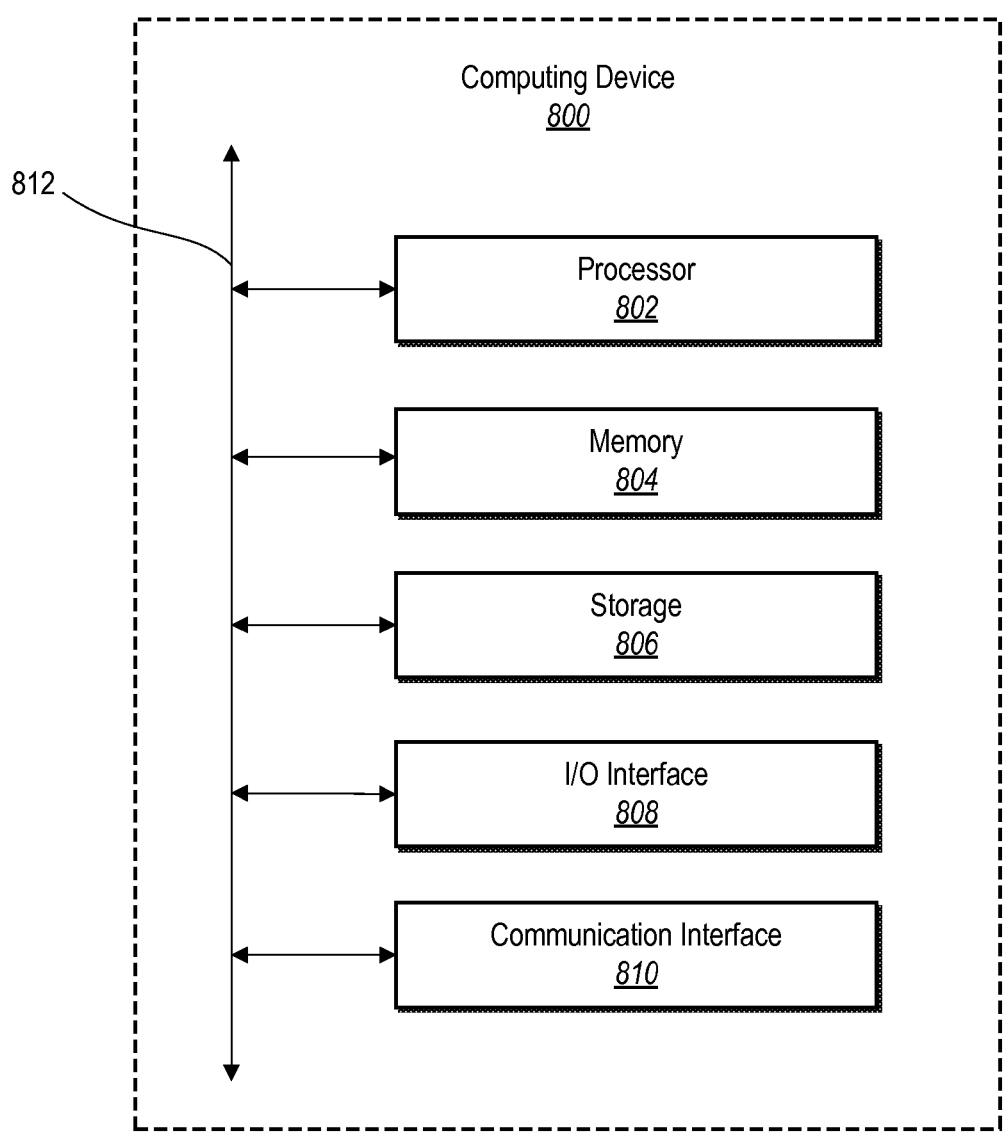
FIG. 8 illustrates a block diagram of an exemplary computing device in accordance with one or more embodiments.

FIG. 8 illustrates, in block diagram form, an exemplary computing device 800 that may be configured to perform one or more of the processes described above. One will appreciate that the client devices 102, 202, 302, 402, 502, server computing device(s) 104, 204, 304, 404, 504 and third-party server device(s) 106, 206, 306, 406, and 506 can each comprise implementations of the data-computing device 800. As shown by FIG. 8, the computing device can comprise a processor 802, memory 804, a storage device 806, an I/O interface 808, and a communication interface 810. While an exemplary computing device 800 is shown in FIG. 8, the components illustrated in FIG. 8 are not intended to be limiting. Additional or alternative components may be used in other embodiments. Furthermore, in certain embodiments, a computing device 800 can include fewer components than those shown in FIG. 8. Components of computing device 800 shown in FIG. 8 will now be described in additional detail.

In particular embodiments, processor(s) 802 includes hardware for executing instructions, such as those making up a computer program. As an example and not by way of limitation, to execute instructions, processor(s) 802 may retrieve (or fetch) the instructions from an internal register, an internal cache, memory 804, or a storage device 806 and decode and execute them. In particular embodiments, processor(s) 802 may include one or more internal caches for data, instructions, or addresses. As an example and not by way of limitation, processor(s) 802 may include one or more instruction caches, one or more data caches, and one or more translation lookaside buffers (TLBs). Instructions in the instruction caches may be copies of instructions in memory 804 or storage 806.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The computing device 800 includes a storage device 806 includes storage for storing data or instructions. As an example and not by way of limitation, storage device 806 can comprise a non-transitory storage medium described above. The storage device 806 may include a hard disk drive (HDD), a floppy disk drive, flash memory, an optical disc, a magneto-optical disc, magnetic tape, or a Universal Serial Bus (USB) drive or a combination of two or more of these. Storage device 806 may include removable or non-removable (or fixed) media, where appropriate. Storage device 806 may be internal or external to the computing device 800. In particular embodiments, storage device 806 is non-volatile, solid-state memory. In particular embodiments, Storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 800 also includes one or more input or output ("I/O") devices/interfaces 808, which are provided to allow a user to provide input to, receive output from, and otherwise transfer data to and from the computing device 800. These I/O devices/interfaces 808 may include a mouse, keypad or a keyboard, a touch screen, camera, optical scanner, network interface, modem, other known I/O devices or a combination of such I/O devices/interfaces 808. The touch screen may be activated with a stylus or a finger.

The I/O devices/interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 808 is configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. In any event, the communication interface 810 can provide one or more interfaces for communication (such as, for example, packet-based communication) between the computing device and one or more other computing devices 810 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI.

This disclosure contemplates any suitable network and any suitable communication interface 810. As an example and not by way of limitation, computing device 810 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 810 may include any suitable communication interface 810 for any of these networks, where appropriate.

The computing device 800 can further include a bus 812. The bus 812 can comprise hardware, software, or both that couples components of computing device 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the server computing devices 212 can comprise a social-networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users The social-networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social-networking system. A user may be an individual (human user), an entity (e.g., an enterprise, business, or third party application), or a group (e.g., of individuals or entities). A user node corresponding to a user may comprise information provided by the user and information gathered by various systems, including the social-networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social-networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social-networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social-networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social-networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social-networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social-networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social-networking system may support a variety of applications, such as photo sharing, on-line calendars and events, gaming, instant messaging, and advertising. For example, the social-networking system may also include media sharing capabilities. Also, the social-networking system may allow users to post photographs and other multimedia files to a user's profile page (typically known as "wall posts" or "timeline posts") or in a photo album, both of which may be accessible to other users of the social-networking system depending upon the user's configured privacy settings. The social-networking system may also allow users to configure events. For example, a first user may configure an event with attributes including time and date of the event, location of the event and other users invited to the event. The invited users may receive invitations to the event and respond (such as by accepting the invitation or declining it). Furthermore, the social-networking system may allow users to maintain a personal calendar. Similarly to events, the calendar entries may include times, dates, locations and identities of other users.

Figure 9:
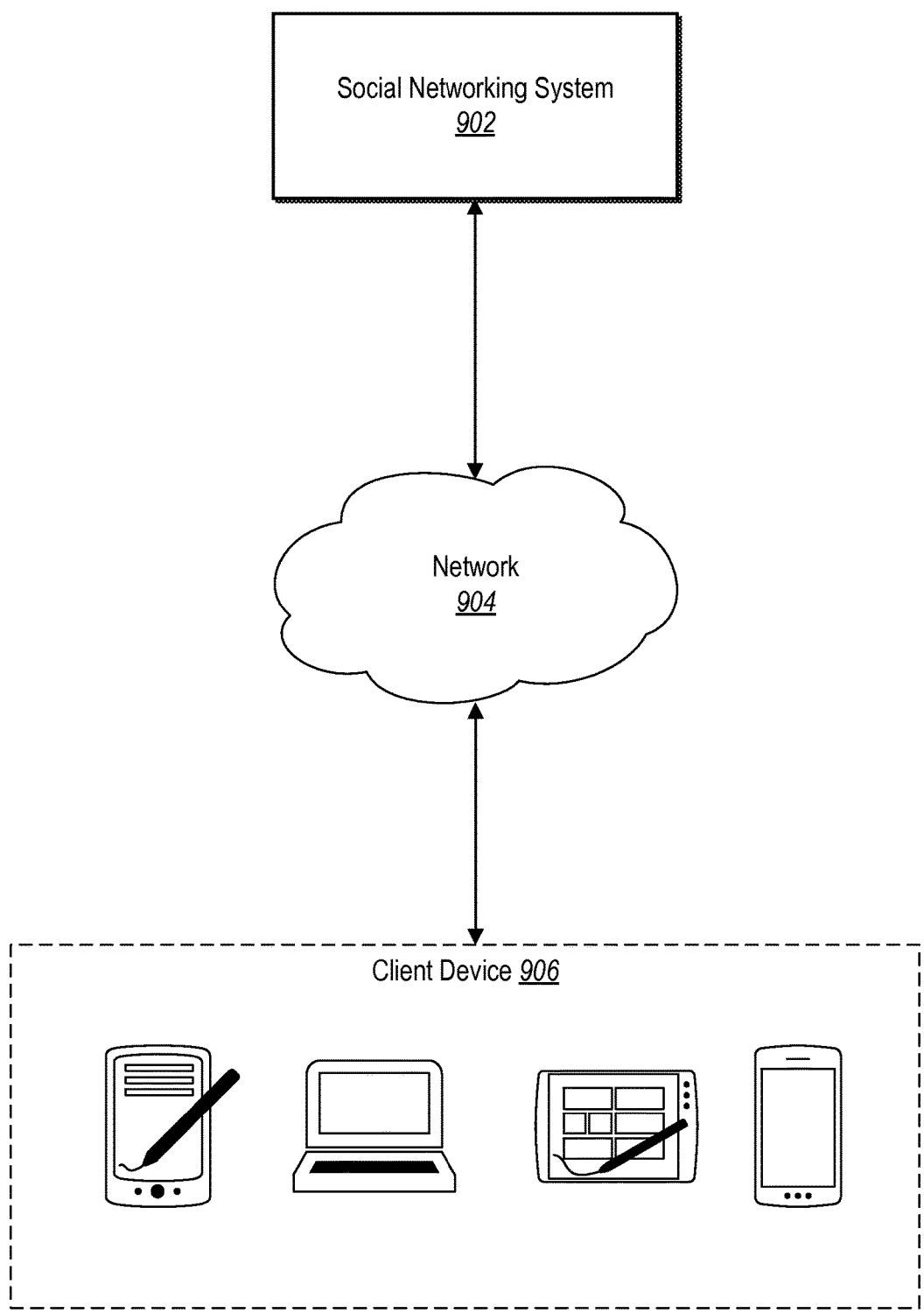
FIG. 9 is an example network environment of a social networking system in accordance with one or more embodiments.

FIG. 9 illustrates an example network environment of a social-networking system. In particular embodiments, a social-networking system 902 may comprise one or more data stores. In particular embodiments, the social-networking system 902 may store a social graph comprising user nodes, concept nodes, and edges between nodes as described earlier. Each user node may comprise one or more data objects corresponding to information associated with or describing a user. Each concept node may comprise one or more data objects corresponding to information associated with a concept. Each edge between a pair of nodes may comprise one or more data objects corresponding to information associated with a relationship between users (or between a user and a concept, or between concepts) corresponding to the pair of nodes.

In particular embodiments, the social-networking system 902 may comprise one or more computing devices (e.g., servers) hosting functionality directed to operation of the social-networking system. A user of the social-networking system 902 may access the social-networking system 902 using a client device such as client device 906. In particular embodiments, the client device 906 can interact with the social-networking system 902 through a network 904.

The client device 906 may be a desktop computer, laptop computer, tablet computer, personal digital assistant (PDA), in- or out-of-car navigation system, smart phone or other cellular or mobile phone, or mobile gaming device, other mobile device, or other suitable computing devices. Client device 906 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over a network 904.

Network 904 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 906 may access the social-networking system 902.

While these methods, systems, and user interfaces utilize both publicly available information as well as information provided by users of the social-networking system, all use of such information is to be explicitly subject to all privacy settings of the involved users and the privacy policy of the social-networking system as a whole.

In the foregoing specification, one or more embodiments have been described with reference to specific exemplary embodiments thereof. Various embodiments are described with reference to details discussed herein, and the accompanying drawings illustrate the various embodiments. The description above and drawings are illustrative of one or more examples, and are not to be construed as limiting. Numerous specific details are described to provide a thorough understanding of various embodiments.

One or more embodiments may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the disclosure is, therefore, indicated by the appended claims rather than by the foregoing description. All changes that come within the meaning and range of equivalency of the claims are to be embraced within their scope.

What is claimed is:

1. A method comprising:

maintaining, by at least one processor, a social networking profile associated with a user of a social networking system, the social networking profile comprising personal information associated with the user and social networking activity data representing activity of the user within the social network system;

receiving, from a client device of the user, activity identification data corresponding to activity of the user outside of the social networking system, the activity identification data comprising a content identifier and a user identifier associated with the client device, the client device of the user generating the activity identification data comprising the content identifier and the user identifier in response to the client device of the user processing third-party content corresponding to activity of the user at a third-party web page outside of the social networking system using the client device of the user;

parsing, by the at least one processor, the activity identification data from the client device of the user to determine the content identifier and the user identifier associated with the client device;

determining, by the at least one processor, the social networking profile associated with the user corresponding to the user identifier associated with the client device;

processing, by the at least one processor, the content identifier received from the client device of the user to determine the third-party web page and one or more additional details corresponding to a user interaction with the third-party web page based on the content identifier comprising a first part indicating that the third-party web page is a shopping cart web page and a second part indicating one or more products that are currently in a shopping cart associated with the shopping cart web page;

based on determining the third-party web page and the one or more additional details corresponding to the user interaction from the content identifier, generating third-party content activity data describing the user interaction with the third-party web page;

augmenting, by the at least one processor, the social networking profile of the user with the third-party content activity data that corresponds to the activity identification data;

determining, based on the third-party content activity data, that the user placed an identified product in the shopping cart at the third-party web page on a first client device; and providing, to a social networking application on a second client device, an advertisement reminding the user to complete a purchase of the identified product.

2. The method of claim 1, wherein:

the user identifier in the activity identification data is a device identifier associated with the client device of the user; and determining the social networking profile associated with the user comprises determining the social networking profile based on the device identifier.

3. The method of claim 1, further comprising identifying a purchased product from the one or more additional details in the content identifier.

4. The method of claim 1, wherein augmenting the social networking profile of the user comprises:

inferring, based on the second part of the content identifier indicating the one or more products that are currently in the shopping cart associated with the shopping cart web page, a user interest by the user in the one or more products; and augmenting the social networking profile of the user to indicate the user interest in the one or more products.

5. The method of claim 1, further comprising providing a link within the advertisement that is directed to a landing page of a merchant through which the user can complete the purchase of the identified product.

6. The method of claim 4, further comprising determining an identification of the second client device of the user based on identifying the first client device in communication with the social networking system and based on information within the social networking profile.

7. The method of claim 1, wherein providing the advertisement reminding the user to complete the purchase of the identified product comprises providing the advertisement when the user connects to the social networking system using the second client device.

8. The method of claim 7, further comprising providing, to the client device of the user and via a social networking application on the client device, an advertisement related to the one or more products that are currently in the shopping cart.

9. A non-transitory computer readable medium comprising instructions that, when executed by at least one processor, cause a computer system to:

maintain, on at least one server device, a social networking profile associated with a user of a social networking system;

receive, from a client device of the user, third-party activity identification data that includes a content identifier associated with third-party content with which the user interacts outside of the social networking system and a user identifier associated with the client device, the client device of the user generating the third-party activity identification data comprising the content identifier and the user identifier in response to the client device of the user processing third-party content corresponding to activity of the user at a third-party web page outside of the social networking system using the client device of the user;

parse the third-party activity identification data from the client device of the user to determine the content identifier and the user identifier associated with the client device;

determine the social networking profile associated with the user corresponding to the user identifier associated with the client device;

process the content identifier received from the client device of the user to identify the third-party web page and one or more additional details corresponding to a user interaction with the third-party web page based on the content identifier comprising a first part indicating that the third-party web page is a shopping cart web page and a second part indicating one or more products that are currently in a shopping cart associated with the shopping cart web page;

based on identifying the third-party web page and the one or more additional details corresponding to the user interaction from the content identifier, generate third-party content activity data describing the user interaction with the third-party web page;

augment the social networking profile associated with the user with the third-party content activity data that corresponds to the third-party activity identification data;

determine, based on the third-party content activity data, that the user placed an identified product in the shopping cart at the third-party web page on a first client device; and provide, to a social networking application on a second client device, an advertisement reminding the user to complete a purchase of the identified product.

10. The non-transitory computer readable medium of claim 9, wherein the user comprises a first user and the social networking profile comprises a first social networking profile having multiple characteristics, further comprising instructions that, when executed by the at least one processor, cause the computer system to:

identify a second user with a second social networking profile having one or more characteristics that relate to characteristics of the first social networking profile; and send an advertisement to a social networking application associated with the second user, wherein the advertisement comprises a selectable option to purchase the identified product.

11. The non-transitory computer readable medium of claim 10, further comprising instructions that, when executed by at least one processor, cause the computer system to require a threshold number of related characteristics between the first and second social networking profiles before sending the advertisement to the second user.

12. The non-transitory computer readable medium of claim 9, wherein the user comprises a first user and the social networking profile comprises a first social networking profile having multiple characteristics, further comprising instructions that, when executed by the at least one processor, cause the computer system to:

identify a second user with a second social networking profile having one or more characteristics that relate to characteristics of the first social networking profile; and send an advertisement to a social networking application of the second user with an opportunity to purchase another product similar to the identified product.

13. The non-transitory computer readable medium of claim 12, wherein the second social networking profile of the second user relates also indicates an interest in the identified product.

14. The non-transitory computer readable medium of claim 12, wherein the instructions that cause the computer system to process the content identifier cause the computer system to determine that the content identifier indicates that the first user has purchased the identified product.

15. The non-transitory computer readable medium of claim 12, wherein the instructions that cause the computer system to process the content identifier cause the computer system to determine that the content identifier indicates that the first user has selected the identified product to be put into the shopping cart associated with the shopping cart web page.

16. A system comprising:
   at least one processor; and
   at least one non-transitory computer readable storage medium storing instructions thereon that, when executed by the at least one processor, cause the system to:
   maintain a social networking profile associated with a user of a social networking system, the social networking profile comprising personal data representing personal information associated with the user and social networking activity data representing activity of the user within a social network system;
   receive, from a client device of the user, activity identification data representing activity of the user outside of the social network system, the activity identification data comprising a content identifier and a user identifier associated with the client device, the client device of the user generating the activity identification data comprising the content identifier and the user identifier in response to the client device of the user processing third-party content corresponding to activity of the user at a third-party web page outside of the social networking system using the client device of the user;
   parse the activity identification data from the client device of the user to determine the content identifier and the user identifier associated with the client device;
   determine the social networking profile associated with the user corresponding to the user identifier associated with the client device;
   process the content identifier received from the client device of the user to determine the third-party web page and one or more additional details corresponding to a user interaction with the third-party web page based on the content identifier comprising a first part indicating that the third-party web page is a shopping cart web page and a second part indicating one or more products that are currently in a shopping cart associated with the shopping cart web page;
   based on determining the third-party web page and the one or more additional details corresponding to the user interaction from the content identifier, generate third-party content activity data describing the user interaction with the third-party web page;
   augment the social networking profile with third-party content activity data that corresponds to the activity identification data;
   determine, based on the third-party content activity data, that the user placed an identified product in the shopping cart at the third-party web page on a first client device; and
   provide, to a social networking application on a second client device, an advertisement reminding the user to complete a purchase of the identified product.

17. The system of claim 16, wherein the instructions that cause the system to augment the social networking profile cause the system to:
   infer, based on the second part of the content identifier indicating the one or more products that are currently in the shopping cart associated with the shopping cart web page, a user interest by the user in the one or more products; and
   augment the social networking profile of the user to indicate the user interest in the one or more products.

18. The system of claim 17, further comprising instructions, that when executed by the at least one processor, cause the system to provide a link within the advertisement that points to a landing page of a merchant through which the user can complete the purchase of the identified product.

19. The system of claim 18, wherein determining the user placed the identified product in the shopping cart at the third-party web page comprises determining that a part of the content identifier indicates that the identified product is in the shopping cart.

20. The system of claim 16, wherein the instructions that cause the system to provide the advertisement reminding the user to complete the purchase of the identified product cause the system to provide the advertisement when the user connects to the social networking system using the second client device.

* * * * *